United States Patent [19]

Mercurio et al.

[11] 4,015,245

[45] Mar. 29, 1977

[54] BIPROGRAMMABLE ELECTRONIC ACCOUNTING MACHINE

[75] Inventors: Luigi Mercurio, Ivrea (Turin); Piercarlo Ravasio, Calolziocorte (Bergamo), both of Italy

[73] Assignee: Ing. C. Olivetti & C., S.p.A., Ivrea (Turin), Italy

[22] Filed: Sept. 2, 1975

[21] Appl. No.: 609,803

[30] Foreign Application Priority Data

Sept. 2, 1974 Italy .................. 69664/74

[52] U.S. Cl. ......................................... 340/172.5
[51] Int. Cl.$^2$ ...................... G06F 9/18; G06F 3/00
[58] Field of Search .................... 445/1; 340/172.5

[56] References Cited

UNITED STATES PATENTS

| | | | |
|---|---|---|---|
| 3,373,408 | 3/1968 | Ling .................. | 340/72.5 |
| 3,406,379 | 10/1968 | Palevsky et al. .................. | 340/172.5 |
| 3,465,298 | 9/1969 | La Duke et al. .................. | 340/172.5 |
| 3,533,076 | 10/1970 | Perkins et al. .................. | 340/172.5 |
| 3,566,358 | 2/1971 | Hasbrouck .................. | 340/172.5 |
| 3,631,406 | 12/1971 | Kurner .................. | 340/172.5 |
| 3,769,621 | 10/1973 | Osborne .................. | 340/172.5 |
| 3,787,673 | 1/1974 | Watson et al. .................. | 235/156 |
| 3,810,119 | 5/1974 | Zieve et al. .................. | 340/172.5 |
| 3,858,182 | 12/1974 | Delagi et al. .................. | 340/172.5 |
| 3,905,023 | 9/1975 | Perpiglia .................. | 340/172.5 |

*Primary Examiner*—Gareth D. Shaw
*Assistant Examiner*—Jan E. Rhoads
*Attorney, Agent, or Firm*—Schuyler, Birch, Swindler, McKie & Beckett

[57] ABSTRACT

A biprogrammable computer is provided with an operator actuable selector switch. Each position of the selector switch of the computer assigns the keyboard, the console and the display to a selected one of the two programs in progress, so that the data entered by the keyboard is automatically transferred to the memory zone allocated to the program selected at the same time the display displays messages of the selected program. If the program not selected by the selector switch must alert the operator to some abnormalities, it activates a lamp and an associated buzzer. The operator after the end of the keyboard operation, actuates the selector switch and removes the cause of the abnormality. Registers are provided for storing the point of interruption of a program being processed, as well as information for determining if the data being entered by the keyboard relates to the program selected.

5 Claims, 23 Drawing Figures

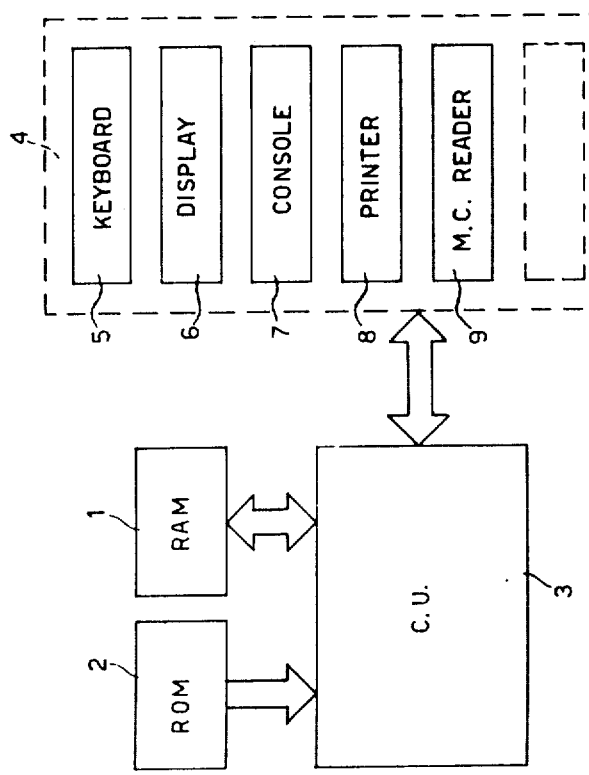

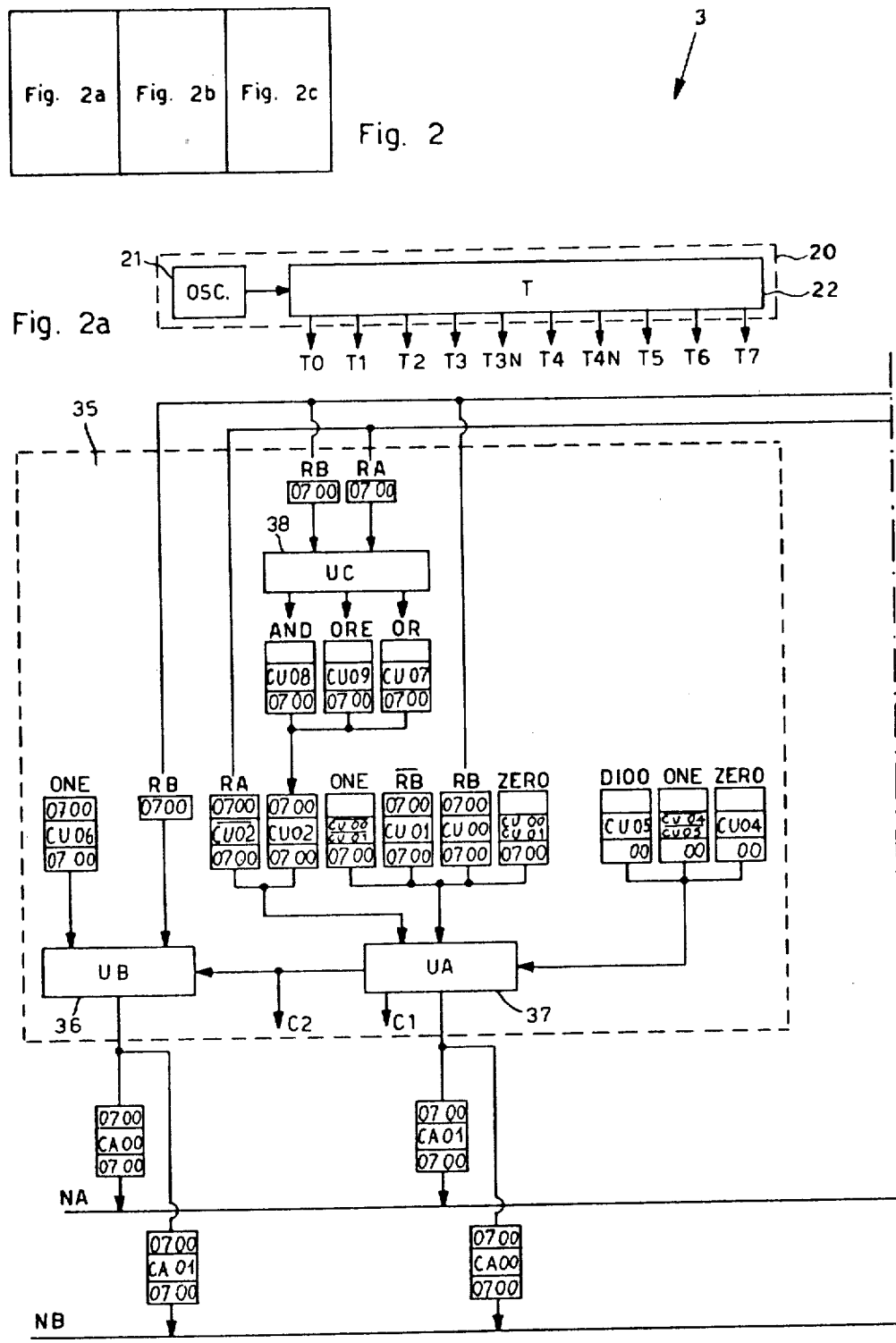

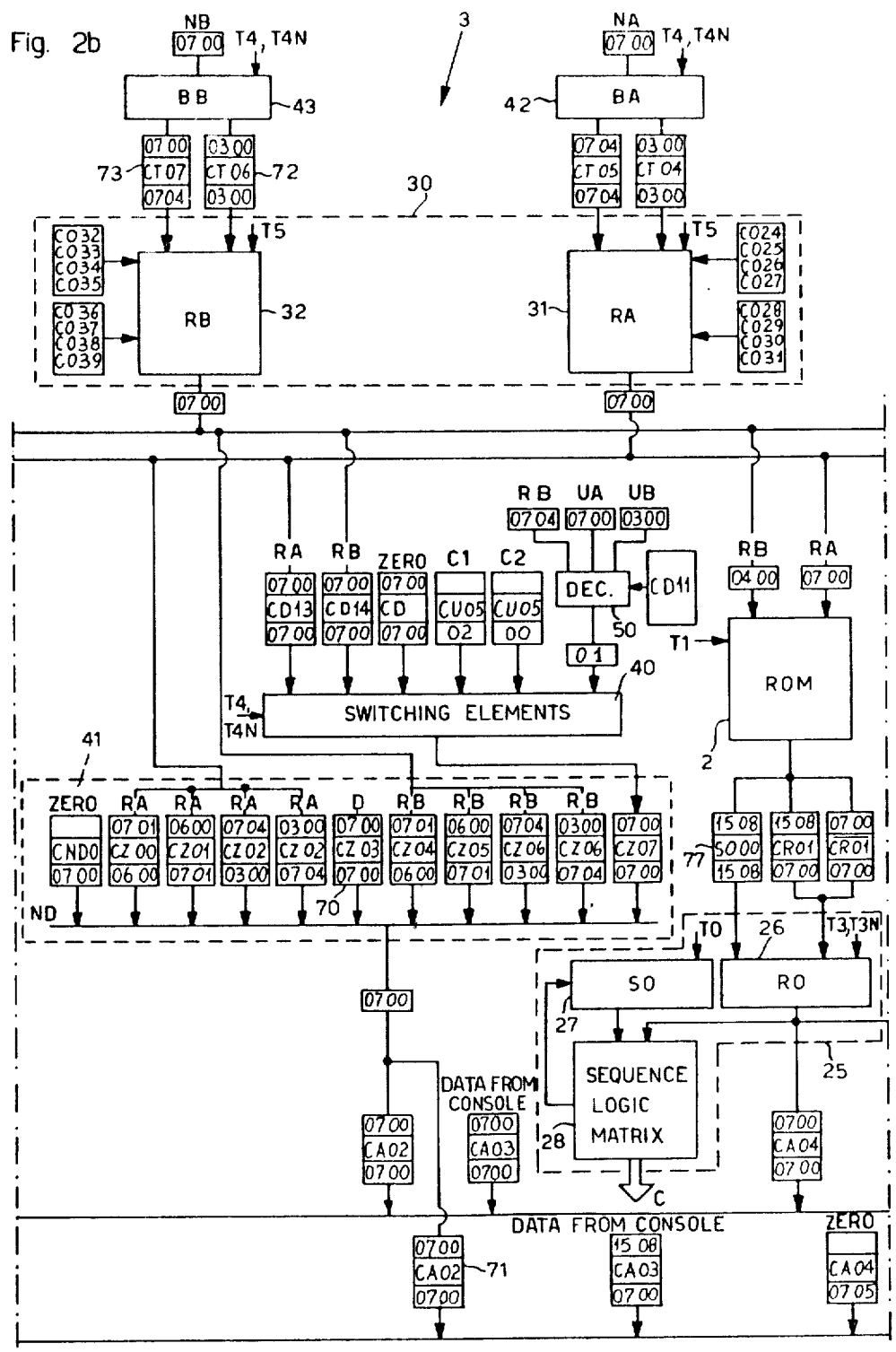

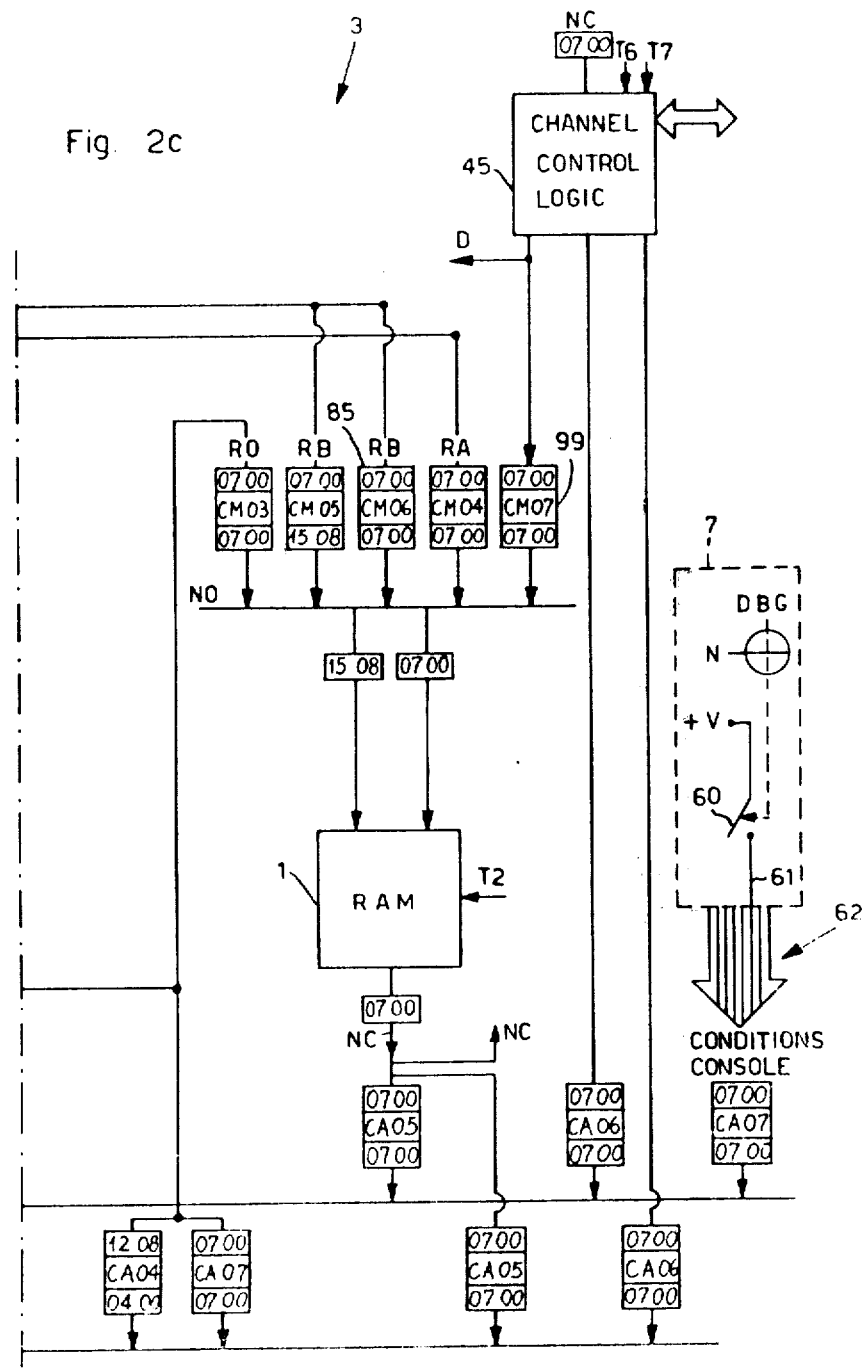

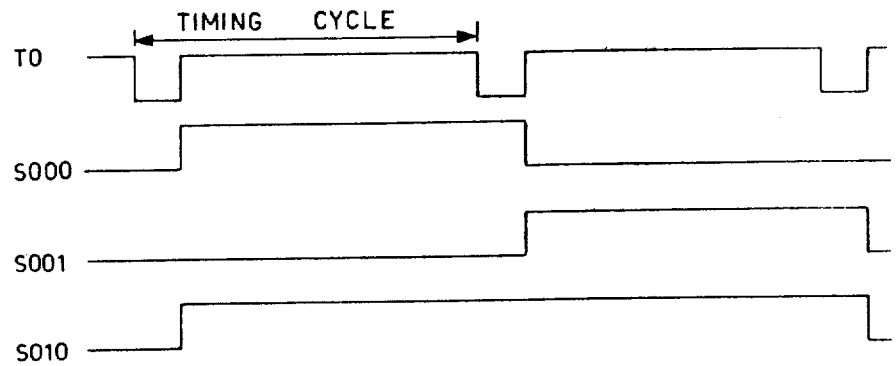
FIG. 5
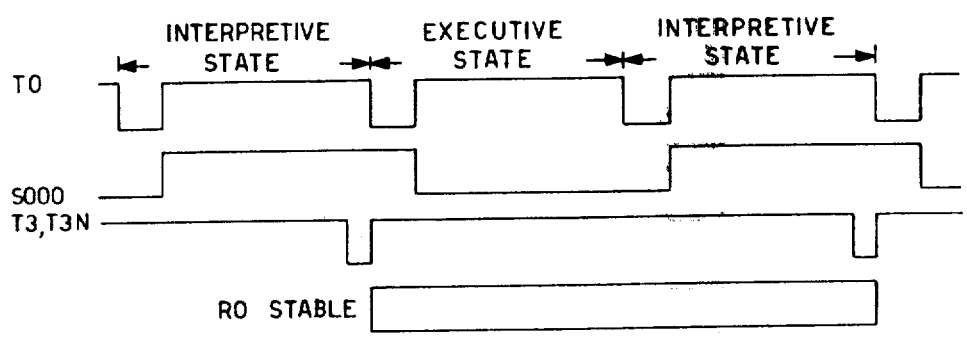
FIG. 6
FIG. 7
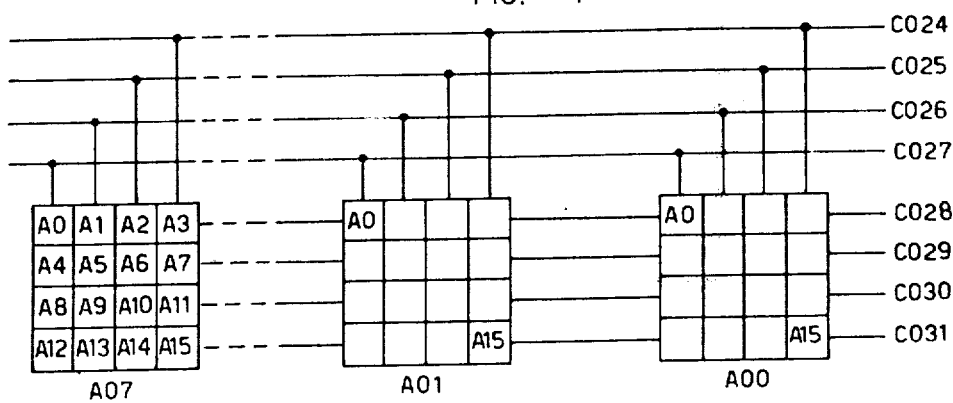

RAM1-ZRM

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | CL-400 | | | | | | | | | | | | | | | |
| 9 | | | | | | SERVICE | | AREA | | | | | 352 | | | |
| A | | | | | | | | | | | | | | | | |
| B → 300 | RB-310 | | P1-311 | | P2-312 | | CP-313 | P1-314 | MI-315 | 316 | 317 | 318 | CP-333 | AI-334 | II-335 | |
| C | | | | | | ITR-353 | | BSD-351 | | | | | | | | |
| D → 301 | RB-320 | | P1-325 | | P2-322 | | CP-323 | CI-324 | MI-325 | 326 | TR-327 | | | | | |
| E | AS-520 | | | | AB-370 | | | P1-450 | | | P2-451 | | | IS-350 | BS-410 | BP441 |
| F | | | | | | | | | | | | | | | | BL-422 |

BIPROGRAMMABLE ELECTRONIC ACCOUNTING MACHINE

BACKGROUND OF THE INVENTION

The present invention relates to an electronic accounting machine of the biprogrammable type, that is, capable of handling two processes at the same time.

Multiprogrammable electronic computers are known in which the simultaneous handling or control of the programs is entrusted to a supervisory (MONITOR) program which allots the hardware cyclically to one of the programs being executed, optimizing the work of the system.

These systems have the disadvantage of not permitting direct control by the operator over the working out of the programs being executed. There is moreover known a biprogrammed processor of smaller size in which provision is made for intervention by the operator in the programs in progress.

In this processor, a control console and a visual display correspond to each of the two programs. Each console enables the error messages directed to the operator and relating to the program associated with it to be visually displayed. Moreover, the console includes the commands adapted to remove the causes of interruption of the operation of the two programs.

The obvious disadvantage of this solution resides in having to duplicate both the console and the display.

SUMMARY OF THE INVENTION

According to the present invention there is provided a biprogrammable electronic accounting system comprising a keyboard for introducing information into the system, a visual display for visually displaying messages for the operator, a service console for signalling abnormalities in the system, a memory including at least two zones adapted to record data and instructions associated with the first program and the second program, a processing unit for executing the instructions, control means for conditioning the processing unit to execute alternately the instructions associated with the first program and the second program, respectively, a change-over switch adapted to be actuated manually to assume a first position associated with the first program and a second position associated with the second program, and means controlled by the change-over switch for allocating the keyboard, the visual display and the console selectively to the first and the second program.

The invention is particularly advantageous in the case of electronic accounting machines in which the two programs being executed generally deal with completely different tasks. For example, program X carries out invoicing or accounting work and therefore requires continuous intervention by the operator, while program Y typically carries out file or record updating work by reading the data directly from an external support, or on-line data transmission work, which therefore does not require frequent interventions by the operator.

It may happen, however, that program Y requires the intervention of the operator for various reasons, such as an error in the data, a reading error or the end of the program. The request for intervention by the operator is signalled by the lighting of a particular lamp on the console and by the activation of an acoustic signal.

In such cases, the operator actuates the change-over switch, alloting the display, the console and the keyboard to the program Y which has requested the intervention. The cause of the interrupt appears on the display and the operator works on the keyboard, introducing data and commands adapted to remove the cause of the interrupt.

Finally, he repositions the change-over switch at program X and resumes the work which has been interrupted.

It should be noted that much of the machine described below is as described in our copending U.S. application Ser. No. 529,493 (which is, however, concerned with debugging the programs).

BRIEF DESCRIPTION OF THE DRAWINGS

The invention will be described in more detail, by way of example, with reference to the accompanying drawings, wherein:

FIG. 1a is a block diagram of an accounting machine embodying the invention;
FIG. 2 shows the arrangement of the central unit;
FIG. 5 shows the timing of the register SO;
FIG. 6 shows signals operating on the register SO;
FIG. 7 shows the operative registers 30;
FIG. 8 is a plan of the registers 30;
FIGS. 9a and 9b show the reserved zone of the RAM2.

LIST OF ABBREVIATIONS

DI = Register 41, indicates the eight switching elements;
DEV = A switching element of the register 41, specified by three bits;
CRT = Character, corresponds to eight memory bits;
MEM = Memory RAM 1
IND = Address
MLS = Sequence logic matrix 28
RB = Base register
P1 = Pointer 1
P2 = Pointer 2
CP = Program conditions
CI = Interrupt code
MI = Instruction modification
EXOR = Exclusive-OR
CI = Interrupt code
IP = Program addresser (L07)
AI = Enable interrupt
PSR = Program in progress (Register 300 of RAM 1)
IPSR = Interrupt program (Register 302 of RAM 1)
OPSR = Interrupted program (Register 301 of RAM 1)
ZRM = Reserved zone of RAM 1
RC = Current reference
CC = Condition code CU = Central unit 3
PU = Peripheral unit 4
IR = Reentry address (Register 327, FIG. 9)
RL = Working register (Register 352 of FIG. 9)
AB = Enable bars
ITR = Reference Table address register.

DESCRIPTION OF PREFERRED EMBODIMENT

A brief description of the electronic accounting machine using the system according to the invention will now be given with reference to FIGS. 1a and 1b.

Figure 1B:
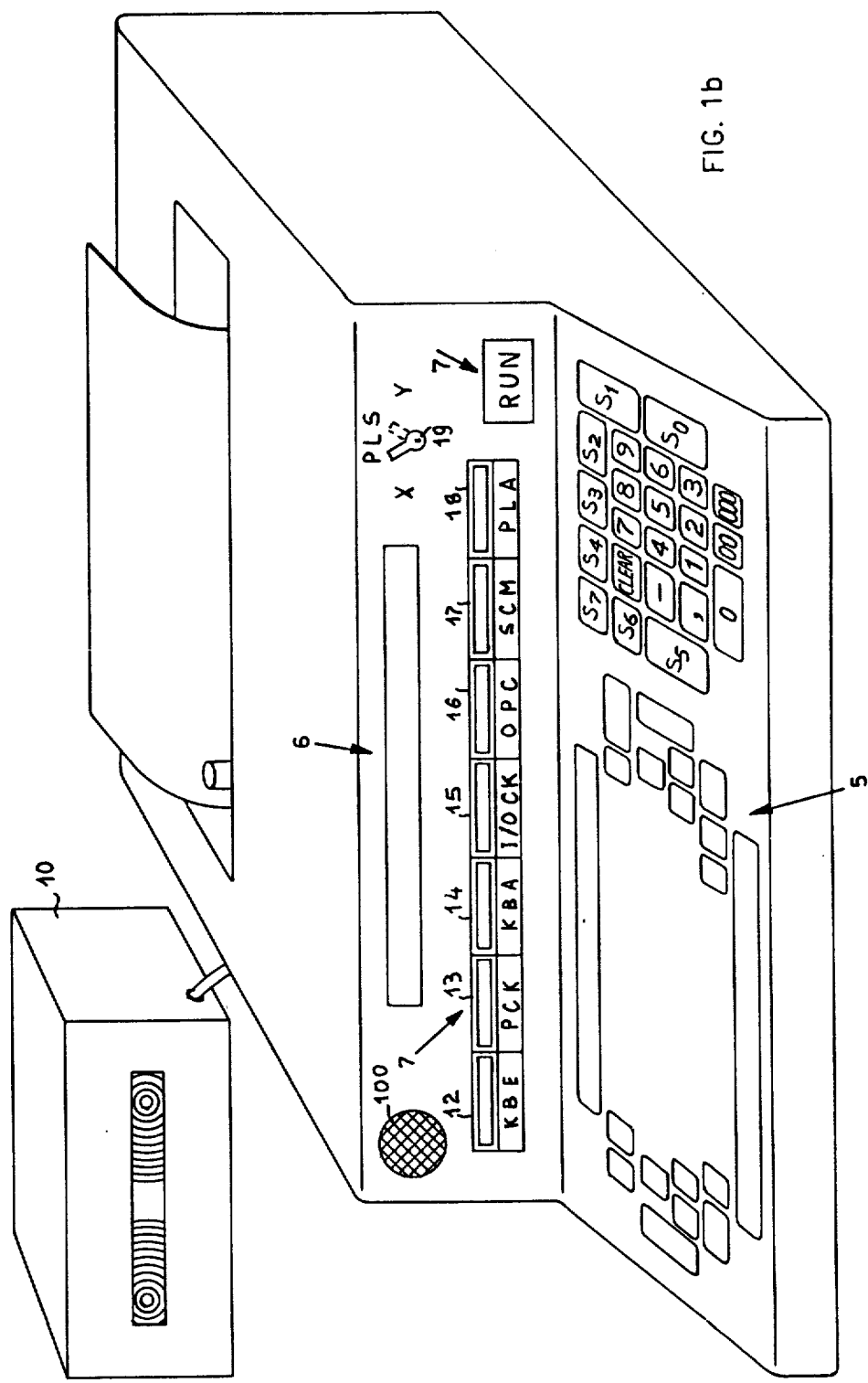
FIG. 1b is a view of the accounting machine.

More particularly, the accounting machine of FIGS. 1a and 1b is of the microprogrammed type. That is, to each instruction of the program there corresponds a microprogram recorded in a permanent memory. The execution of a program instruction is effected by means of the sequential execution of the microinstructions of the respective microprogram.

The accounting machine of FIGS. 1a and 1b comprises a memory RAM1 adapted to contain the instructions and the data of the program in process of execution, and a memory ROM2 adapted to contain the microprograms which implement the instructions of the programs.

The RAM1 and the ROM2 may be of any known type on the market and will therefore not be described in detail; it is only made clear that each cell of both of the memories is adapted to contain sixteen bits.

The RAM1 and the ROM2 are connected to a central processing unit 3, which will be described in detail hereinafter and which is connected in turn to a group of peripheral units 4.

The peripheral units 4 may be of various kinds according to the particular application for which the accounting machine is intended. More particularly, the peripheral units shown are: an alphanumeric keyboard 5, a visual display 6, a control console 7, a printer 8, a read/write unit 9' adapted to record and read data on a magnetic card 9, a magnetic tape reader 10 and a line controller 11 adapted to control the exchange of data between the accounting machine and a remote processor. The above-cited peripheral units except the console 7 are not described in detail because they do not relate to the invention and are based on embodiments well-known in the art.

The console 7 includes a series of seven lamps 12 to 18 and an acoustic signalling device 100 which inform the operator of particular conditions associated with the program being executed. More particularly, the lamp 12 (KBE) indicates an error of introduction from the keyboard, the lamp 13 (PCK) indicates an abnormality in the working out of the program; the lamp 14 (KBA) indicates that the keyboard buffer is almost full; the lamp 15 (I/O CK) indicates that there is an error on the input/output channel; the lamp 16 (OPC) indicates that the program requires intervention by the operator; the lamp 17 (SCM) indicates that a service message for the operator is present on the display 6; and the lamp 18 (PLA) indicates that the program not selected by the change-over switch 19 has a message for the operator. Finally, the change-over switch 19 (PLS) allots the keyboard 5, the display 6 and the lamps 15, 16 and 17 to program X or program Y.

CENTRAL UNIT (FIG. 2)

A detailed description of the central unit 3 will now be given with reference to FIG. 2.

The central unit 3 is an assembly of logic circuits which handle and execute the various microprograms contained in the ROM 2.

It is composed of four main blocks:

A timer 20 which times the development of the processing of the data inside the central unit 3. This timer is composed of an oscillator 21 and an assembly of signal generating circuits 22.

A sequence logic matrix network 25, which staticizes and interprets the codes of the microinstructions read from the ROM 2 and generates the commands necessary for the execution thereof. This network is composed of a microinstruction register (RO) 26, a state register (SO) 27 and a sequence logic matrix (MLS) 28.

An operative network which carries out the processing of the data by methods imposed by the sequence logic matrix 28. The operative network comprises: the operative registers 30 (scratch pad) which are divided into two groups RA-31 and RB-32 each of which is composed of sixteen eight-bit registers hereinafter referred to as AO-A15 and BO-B15, respectively; an arithmetic unit 35 which is formed by three blocks UA-36, UB-37, UC-38 with eight-bit parallelism; the switching elements DI-40; a shift network ND-41, an input network to the operative registers which comprises the nodes NA and NB and two registers BA-42, BB-43, and a network providing connection with the RAM 1 and composed of nodes NO and NC; and, a channel logic 45 which controls the interface providing connection of the peripheral units and monitors the operative simultaneity of the central unit 3.

A detailed description of the above-enumerated blocks will now be given.

1. TIMER (20)

The oscillator 21 generates periodic pulses which define a fixed period of time called the machine cycle which lasts for the time necessary for the execution of an elementary operation (for example: reading of an operative register 30, its incrementing and rewriting in the operative register 30).

During the machine cycle, signals are generated by the circuit 22, the duration of which and the positioning of which in the machine cycle are fixed.

The function of these signals is predetermined and the fact that they act or do not act on the circuits of the central unit 3 is determined by the conditions generated by the sequence matrix 28 in the manner to be described hereinafter.

The working of the central unit 3 is completely synchronous with this timing, as is also the conversation with the peripheral units.

Ten signals are generated by the circuit 22 and their use is illustrated hereinafter. The signals are:

T0 which acts on the state register 27;
T1 which times the reading of the ROM 2;
T2 which times the RAM 1;
T3A which acts on the register R0-26;
T3N which also acts on the register R0-26;
T4A which acts on the registers BA42, BB43 and on the switching elements 40;
T4N which acts on the registers BA42, BB43 and on the switching elements 40;
T5 which acts on the operative registers 31 and 32; and, T6 and T7 which act on the channel logic 45.

Figure 3:
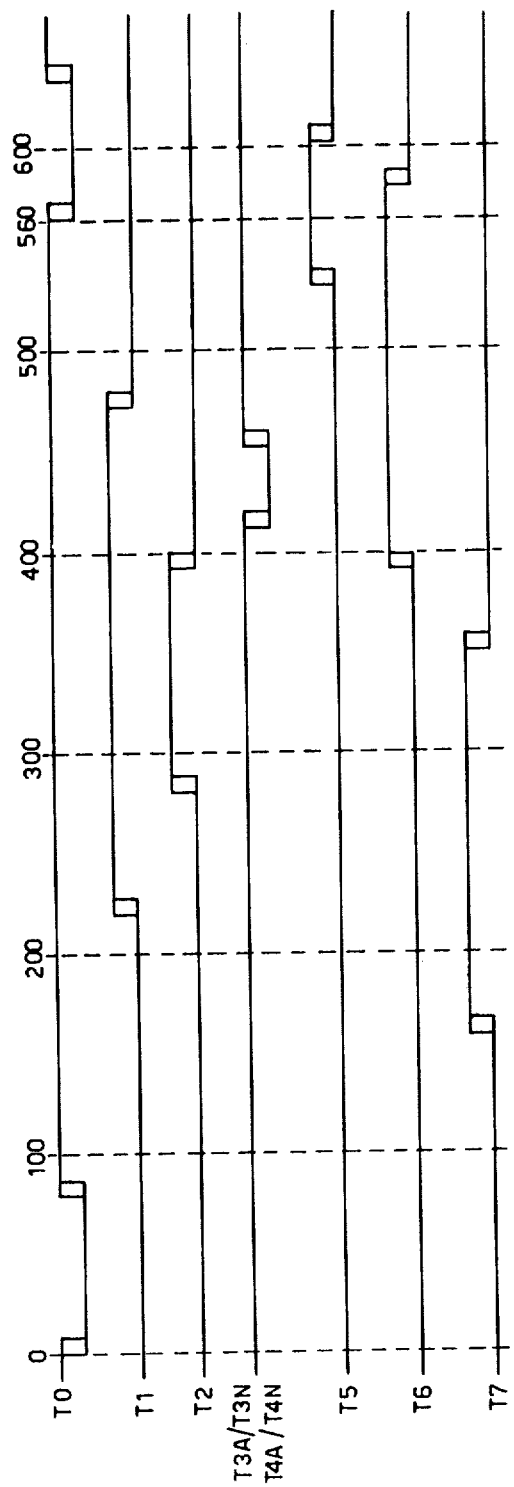
FIG. 3 shows the timing signal of the central unit.

FIG. 3 is a timing diagram in which the signals mentioned appear.

Of course, the oscillator 21 and the circuits 22 are not described in detail, since they are known in the field of circuit design.

2. EXECUTION OF MICROINSTRUCTIONS

Before proceeding to the description of the other blocks of the central unit 3, a brief mention will now be made of the microinstructions used by the central unit 3 in the debugging system according to the invention and of the execution thereof.

The execution of a microinstruction can be divided into two phases: (1) An interpretive phase, common to all the microinstructions, which reads the addressed microinstruction from the ROM 2, prearranges the carrying out thereof and increments the addresser of the ROM 2. This phase is obviously independent of the code of the microinstruction read. (2) An execute phase, during which the processing of the data takes place in accordance with the procedures indicated by the microinstruction read in the preceding interpretive phase. The interpretive phase is always performed in a single machine cycle and the configuration of the signals (hereinafter called "commands") is stable within the limits of the cycle. The configuration of these commands defines the operations to be performed and is called the "Interpretive State."

Figure 4:
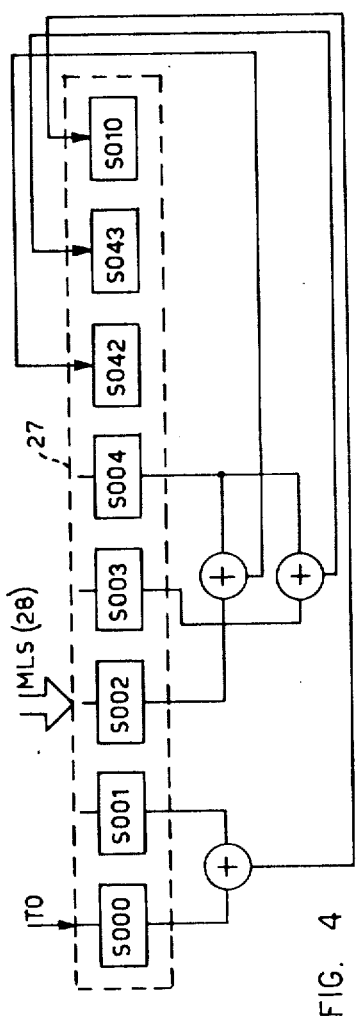
FIG. 4 shows the state register SO.

The presence of the interpretive state is identified by a flip-flop S000 of the register 27 (FIG. 4).

The execute phase is performed in one or more machine cycles to which there correspond as many states, each defined by a corresponding flip-flop of the register 27.

Throughout the execute phase, the code of the microinstruction in question remains stable in the register 26, while the situation of the flip-flops of the register 27 which define the current state develops.

Each state defines the next as a function of the code of the microinstruction read.

At the end of the execution of each microinstruction a return is made to the interpretive state S000 to read the following microinstruction from the ROM 2.

During the two phases, the interpretive phase and the execute phase, the combinatory network 28 (MLS), which has the registers 26 and 27 as inputs, generates commands C which enable given flows of information through the operative network or the other blocks of the central unit 3.

The information then flows between the blocks of the central unit 3 through a series of AND gates of various types which are controlled by the commands C generated by the combinatory network 28. In FIG. 2 these gates are symbolically represented as divided into three zones. The central zone contains the control signal of the gate generated by the network 28 (MLS). When this command is present, the signals at the input of the gate are transferred to the following block. The pairs of numbers varying from 00 to 15 which are in the top zone and the bottom zone of the gates indicate the number of bits which they allow to pass and more precisely the positions in which these bits are at the input and the output. For example, a gate having the pairs of numbers 07, 00 both at the input and output is a gate which transfers an eight-bit character in direct parallel. On the other hand, a gate having the pair of numbers 03, 00 in the top zone, that is as the input, and the pair of numbers 07, 04 in the bottom zone, that is as the output, is a gate which transfers four bits, shifting them to the left by four places. If 07, 04 are input and 03, 00 are output, the shifting is by four places to the right. Finally, if the input zone is empty, this signifies that the bits are forced into the gate from outside.

There is described hereinafter, with reference to Table A, the set of microinstructions used by the debugging system according to the invention, omitting the other microinstructions which the central unit is capable of executing. The microinstructions given in Table A have a fixed format of sixteen bits which corresponds to one word of the ROM 2. The format of the microinstructions is as follows:

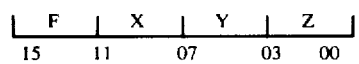

```
| F | X | Y | Z |
 15  11  07  03  00
```

The fields, each of four bits, have the following significance:

F is the operative code of the microinstruction;
X indicates the first operand;
Y indicates the second operand;
Z is an extender of one of the foregoing fields.

When the fields X and Y specify as operands the registers A, B or L of the operative registers 30, they will be indicated in the microinstructions by the symbols, A*x*, B*x*, L*x*, A*y*, B*y*, L*y*, respectively.

The microinstructions are divided into groups distinguished by the different function code, that is by the different binary configuration of the field F of each of the microinstructions.

The microinstructions having the same function code are executed by following the same sequence of states.

TABLE A

| Name | F | X | Y | Z | FUNCTION |
|------|---|---|---|---|----------|
|      |   |   |   |   | LOGICAL ARITHMETIC |
| ADDB | 0110 | A | B | 0101 | B ← (A + B) |
| ANDA | 0110 | A | B | 1000 | if (A ← A AND B) = 0 |
| ANDB | 0110 | A | B | 0100 | if (B ← A AND B) = 0 |
| AND  | 0110 | A | B | 0000 | if (A AND B) = 0 |
| ORA  | 0110 | A | B | 1110 | if (A ← A OR B) = 0 |
| ORE  | 0110 | A | B | 0111 | if (A EX OR B) = 0 |
| SOT  | 0110 | B | B | 0010 | if (A − B) > 0  DOO = 1 |
|      |   |   |   |   | TRANSFER |
| TAB  | 0101 | A | B | 1100 | B ← A |

TABLE A-continued

| Name | F | X | Y | Z | FUNCTION |
|---|---|---|---|---|---|
| TBA | 0101 | A | B | 0011 | $A \leftarrow B$ |
| | | | | | EXCHANGE |
| SLL | 0100 | L | L | 1111 | $Ax \rightleftarrows By;\ Bx \rightleftarrows Ay$ |
| | | | | | DECREMENT |
| DCA | 1010 | A | 0100 | 1010 | if $(A \leftarrow A - 1) = 0$ puts D01 = 1 |
| | | | | | LOAD SWITCHING ELEMENTS |
| TADI | 1011 | A | 1110 | 0111 | $DI \leftarrow A$ |
| TBDI | 1011 | B | 1111 | 0111 | $DI \leftarrow B$ |
| REDI | 1011 | 0 DEV | 0110 | 0110 | $DEV \leftarrow \text{'0'}$ |
| SEDI | 1011 | 1 DEV | 0110 | 0110 | $DEV \leftarrow \text{'1'}$ |
| SHSB | 1011 | B | 0001 | 0101 | SHIFT B one bit to left |
| ROTB | 1011 | B | 0001 | 0110 | Exchange semibyte |
| AZAP | 1011 | A | 0010 | 0111 | Zeroize left semibyte |
| | | | | | JUMP |
| SAI | | 000 | ⌊ I ⌋ | | Unconditional jump IND. I |
| SADO | | 0010 | 0 DEV ⌊ I ⌋ | | Jump to I if DEV = O |
| SADI | | 0011 | 0 DEV ⌊ I ⌋ | | Jump to I if DEV = 1 |
| | | | | | WRITE/READ RAM 1 |
| MAD | 1100 | A | ⌊ I ⌋ | | A MEM. IND. I |
| AMD | 1101 | A | ⌊ I ⌋ | | MEM. IND. I $\leftarrow$ A |
| AMI | 1110 | L | A | 1011 | MEM. IND. L $\leftarrow$ A |
| BMI | 1110 | L | B | 0011 | MEM. IND. L $\leftarrow$ B |
| AMIP | 1110 | L | A | 1001 | MEM. IND. L $\leftarrow$ A; L $\leftarrow$ L + 1 |
| BMIP | 1110 | L | B | 0001 | MEM. IND. L $\leftarrow$ B; L $\leftarrow$ L + 1 |
| MAIP | 1110 | L | A | 1101 | A $\leftarrow$ MEM. IND. L; L $\leftarrow$ L + 1 |
| MBIP | 1110 | L | B | 0101 | B $\leftarrow$ MEM. IND. L; L $\leftarrow$ L + 1 |
| | | | | | FORCE REGISTERS 30 |
| CRTA | 1000 | A | ⌊ CRT ⌋ | | A $\leftarrow$ CRT |
| CRTB | 1001 | B | ⌊ CRT ⌋ | | B $\leftarrow$ CRT |
| | | | | | READ ROM 2 |
| ROMA | 0111 | A | 0000 | 0000 | A $\leftarrow$ MEM. IND. L2; if b07 = 0, put 8 least significant bits, if b07 = 1, put 8 most signifiant bits. b07 = most significant bit of the register B2. L2 $\leftarrow$ L2 + 1 |
| TCCA | 1010 | A | 1000 | 1000 | A CRT FROM CONSOLE |

3. REGISTER SO (27)

The register 27 comprises eight flip-flops (FIG. 4) which differentiate among the various machine cycles. They are: S000-S001-S002-S003-S004-S042-S043-S010.

Their positioning is controlled by the logic matrix 28 by directly analyzing the field F of the microinstruction present in the register 26 (RO). The changing of the configuration of the register 27 takes place with the leading edge of the signal T0 and this is the first operation which the matrix 28 effects within the limits of a timing cycle.

The signals S042, S043, S010 are obtained from the OR function of the following states:

S043 = S004 + S002
S043 = S004 + S003
S010 = S000 + S001

FIG. 5 is a timing diagram relating the state S010 to the states S000 and S001. Of course, the states S042 and S043 will be generated in similar manner. It is to be noted, therefore, that the matrix 28 generates only five states, that is to say S000 to S004, while the other three states are derived therefrom.

The sequence of the state corresponding to the microinstructions of TABLE A is now given in TABLE B.

TABLE B

| F | SEQUENCE OF EXECUTION | | | TYPE OF MICROINSTRUCTION |
|---|---|---|---|---|
| 000 | S001 | | | ⎫ |
| 0010 | S001 | | | ⎬ JUMP |
| 0011 | S001 | | | ⎭ |
| 0100 | S002 | S003 | | |
| 0101 | S002 | | | TRANSFER |
| 0110 | S002 | | | ARITHMETICAL AND LOGICAL |
| 0111 | S002 | S001 | S004 | |
| | | | | |
| 1000 | S004 | | | ⎫ READING |
| 1001 | S004 | | | ⎭ ROM 2 INTO RA/RB |
| | | | | |
| 1010 | S004 | | | ± CHECK; VARIOUS CONSOLE |
| 1011 | S004 | | | SHIFT AND OPER. ON. |
| | | | | SWITCHING ELEMENTS 40 |
| 1100 | S004 | S002 | | ⎫ |
| 1101 | S004 | S002 | | ⎬ |
| 1110 | S004 | S002 | | ⎬ MEMORY RAM 1 |
| 1110 | S004 | S003 | | ⎬ |
| 1111 | S004 | S003 | | ⎭ |

It is to be noted, finally, that all the sequences are preceded by the interpretive state S000. The commands generated by the matrix 28 in the individual states will be described below.

4. MICROINSTRUCTION REGISTER 26 (RO)

The register-26 comprises 16 flip-flops which staticize the code of the microinstruction or the information read from the ROM at the address specified by predetermined operative registers 30.

The 16 flip-flops are divided into two groups of eight; those which are least significant are commanded by the signal T3N, the others by the signal T3A.

The generation of the signals T3N and T3A takes place only in the two states in which reading of the ROM is performed, that is in the interpretive state S000 of all the microinstructions and in the state S001 of the microinstruction ROMA.

With the leading edge of the signals T3N and T3A, the 16 bits read from the ROM 2 are staticized in the register R0-26 and constitute the code of the microinstruction which must be executed.

The information remains stable in the register during all the following execute states, as shown in FIG. 6.

As has been said, in the state S001 of the microinstruction R0MA a second reading of the ROM takes place. The eight least significant flip-flops of the register 26 are positioned with the signal T3N by the eight most or least significant bits read. This depends on the value of the bit 07 of the register B2 (see TABLE A).

5. THE OPERATIVE REGISTERS 30 (SCRATCH PAD)

The operative registers 30 are arranged in two series, referred to as A and B, of sixteen registers, each having a capacity of eight bits (FIG. 8). The bits of the same weight of the registers of each of the two series, for example the series A, are arranged in a 4 × 4 matrix (FIG. 7), so that there are eight 4 × 4 matrices in which the first bits of each thereof form the register A0, the second bits the register A1, and so on.

To select a register, for example the register A15, it is sufficient to send on the eight select wires shown in FIG. 7 eight commands C024–C031 having the following configuration: 10000001.

Of course, the commands C024–C031 are generated by the sequence matrix 28, which takes account of the fields X and Y of the microinstructions for generating both the select commands (C024–C031) and the state associated (forced into S0) with one of the two series of registers. More particularly, the state S043 selects one of the registers of the series B, while the state S042 selects a register of the series A. The state S010, on the other hand, is associated with a register having a length of 16 bits and formed by the like A and B registers, this register being called a "Long Register" and indicated by the letter L. The writing of an item of information in one of the registers 30 with the information already recorded in the registers 42 and 43 is timed, as has been said, by the signal T5 (FIG. 2). At this instant, the commands CT04–CT07 generated by the logic matrix 28 select the data to be transferred to the registers 31 and 32 at the level of four bits at a time. Thus it is possible to modify one of the registers A or B in one part thereof, leaving the other part unchanged.

6. ARITHMETIC UNIT 35

The arithmetic unit 35 executes arithmetical and logical operations on the contents of the operative registers 30.

It is made up of two adders UA-36 and UB-37 with eight-bit parallelism and a logic network UC-38. The two adders 36 and 37 (UA and UB) are interconnected in such manner as to obtain a single adder with sixteen-bit parallelism. However, only in particular operations, that is when a long register (L) is operated on, are all the sixteen outputs of the adder significant.

The network UC-38, which may enter UA as first operand, performs the logical OR, AND and exclusive-OR functions.

By means of a decoder 50 (FIG. 2b), the arithmetic unit 35 moreover supplies information on the result of the arithmetical and logical operations which are stored in the switching device D02 as a result of the commands CD11 and CD12 generated by the logic matrix MLS-28. This switching device is then sensed by the instructions SADO and SADI to effect conditional jumps.

There is given hereinafter in Table C a list of the microinstructions which concern the arithmetic unit 35, in which appears the symbolic name of the commands CU00-CU09 generated by the MLS-26 which effect the transfer of the data, and the states of validity of the commands.

TABLE C

| Micro-instrn. | CU00 | CU01 | CU02 | CU04 | CU05 | CU06 | CU07 | CU08 | CU09 | State of Validity |
|---|---|---|---|---|---|---|---|---|---|---|
| ADDB | 1 | 0 | 0 | 0 | 1 | X | X | X | X | S002 |
| DCA  | 0 | 0 | 0 | 1 | 0 | X | X | X | X | S004 |
| AND  | 1 | 1 | 1 | 1 | 0 | X | 0 | 1 | 0 | S002 |
| ANDA | 1 | 1 | 1 | 1 | 0 | X | 0 | 1 | 0 | S002 |
| ANDB | 1 | 1 | 1 | 1 | 0 | X | 0 | 1 | 0 | S002 |
| ORA  | 1 | 1 | 1 | 1 | 0 | X | 1 | 0 | 0 | S002 |
| ORE  | 1 | 1 | 1 | 1 | 0 | X | 0 | 0 | 1 | S002 |
| ROMA | 1 | 1 | 0 | 0 | 0 | 0 | X | X | X | S001 |
| TAB  | 1 | 1 | 0 | 1 | 0 | 0 | X | X | X | S002 |
| TBA  | 1 | 1 | 0 | 1 | 0 | 0 | X | X | X | S002 |
| MAIP | 1 | 1 | 0 | 0 | 0 | 0 | X | X | X | S004 |
| AMIP | 1 | 1 | 0 | 0 | 0 | 0 | X | X | X | S004 |
| MBIP | 1 | 1 | 0 | 0 | 0 | 0 | X | X | X | S004 |
| BMIP | 1 | 1 | 0 | 0 | 0 | 0 | X | X | X | S004 |
| MBI  | 1 | 1 | 0 | 1 | 0 | 0 | X | X | X | S004 |
| AMI  | 1 | 1 | 0 | 1 | 0 | 0 | X | X | X | S004 |
| BMI  | 1 | 1 | 0 | 1 | 0 | 0 | X | X | X | S004 |

NOTE: X = immaterial

7. THE SWITCHING ELEMENTS (40)

The switching elements 40 comprise eight flip-flops (D00-D07) which staticize events which occur during the execution of some microinstructions. Their contents are tested during the execution of the microprograms to condition the making of address jumps in the addressers of the ROM 2. The loical microinstructions (AND, OR, etc.) affect them automatically for depositing the result of the logical operation carried out.

Each individual switching element can moreover be positioned at ZERO or at ONE by the microinstructions REDI and SEDI, respectively (Table A).

In the format of the microinstructions (Table A) the three least significant bits of the field X constitute the binary address (00–07) of the switching element concerned.

Some microinstructions (TADI-TBDI-SADI) force the eight bits of the register A or B selected into the eight switching elements (See Table A).

Some arithmetical and logical microinstructions (AND, OR, ORE, ADD), on the other hand, position the switching elements with their qualitative result; more particularly, the switching element DOI staticizes the occurrence of a zero result output by the arithmetic unit 35.

The switching elements 40 change their state at two different times. The switching elements D00–D03 change over with the signal T4N, while the switching elements D04–D07 change over with the signal T4A. Given hereunder is Table D, which contains the microinstructions concerning the switching elements 40 and the commands enabling the switching elements themselves which are generated by the MLS 28.

TABLE D

| Microinstrn. | CDRR | CU05 | CD11 | CD13 | CD14 |
|---|---|---|---|---|---|
| REDI    | 1 | 0 | 0 | 0 | 0 |
| DCA     | 0 | 0 | 1 | 0 | 0 |
| AND/A/B | 0 | 1 | 1 | 0 | 1 |
| OR/A/B  | 0 | 0 | 1 | 1 | 0 |
| ORE     | 0 | 0 | 1 | 0 | 1 |
| ADD/A/B | 0 | 1 | 1 | 0 | 0 |
| TADI    | 0 | 0 | 0 | 1 | 1 |
| SADI    | 0 | 0 | 0 | 1 | 0 |
| TBDI    | 0 | 0 | 0 | 0 | 1 |

8. SHIFT NETWORK 41

Through this network formed by circuits of the AND-OR type it is possible to establish a line for the flow of information among all the possible lines towards the input network (NA, NB) and thereby to the operative registers (31, 32). The shift network 41 is formed by a group of eight gates divided into two sub-groups connected to the operative registers RA-31 and RB-32, respectively. Each of these sub-groups is capable of performing a shift or a rotation on the data coming from the operative register 30, as is shown symbolically in FIG. 2b. Each gate of the two sub-groups is addressed by a combination of three bits of the microinstructions SHSB and ROTB which act on this network. These combinations are indicated symbolically in FIG. 2b by the symbols CZ00–CZ07, while the other two gates of the network 41 are commanded in direct manner and serve to force the conditions of the switching elements or to zero them. An input to the shift network 41 is moreover provided by a gate 70 which is connected to the channel logic 45 by means of the data introducing channel D. This gate 70 permits the introduction of the data coming from the peripheral units through the medium of the logic 45 into the operative registers 30 through the nodes NA or NB.

9. INPUT NETWORK TO THE OPERATIVE REGISTERS

This is a network to which the operative registers 31 and 32 lead; the network enables the byte which is to be sent to and written in the operative registers 31 and 32 to be selected.

This network is formed by the nodes NA and NB and the registers BA-42 and BB-43.

The nodes NA and NB are two networks, each with parallelism of eight bits, which select one of the eight possible paths or flows of information to the operative registers 31 and 32 by means of the commands CA0-0–CA07 generated by the MLS 28.

The information selected may come in fact from the following units:
— the arithmetic unit 35 (two paths),
— the shift network 41 (ND), — the ROM 2,
— the RAM 1,
— the console 7 (two paths),
— the channel logic 45.

The registers BA-42 and BB-43 staticize the information present on the nodes NA and NB and selected by one of the commands CA00–CA07 in the presence of the signal T4. The contents of BA-42 and BB-43 may or may not be written in the operative registers 31 and 32 according to whether the commands CT04–CT07 hereinbefore described are activated or not.

10. NETWORK PROVIDING CONNECTION TO THE RAM 1

The cental unit 3 is connected to the input of the memory RAM 1 through the medium of a node N0 with parallelism of 16 bits (N000–15). This node is activated during the execution of the microinstructions for writing into the memory and for reading from the memory.

The information which can be written may come from the registers RA-31, RB-32 or from the peripheral units through the medium of the channel logic 45 when the commands CM04, CM06 and CM07, respectively, are generated by the MLS 28.

2. In carrying out the reading microinstructions, on the other hand, the node N0 is not significant and is not used by the RAM 1. Instead, the output NC is of import, and can be sent to a B register if the state S002 and the command CA05 are present, or to an A register if the state S003 and the command CA05 are present.

In Table E are listed the microinstructions using the RAM 1, with the respective commands and states generated by the MLS 28.

TABLE E

| MICRO-INSTRN. | State S004 COMMANDS | | | State S002 COMMANDS | | | State S003 COMMANDS | | |
|---|---|---|---|---|---|---|---|---|---|
| | CM03 | CM04 | CM05 | CM04 | CM06 | CM07 | CM04 | CM06 | CM07 |
| AMD  | 1 | 0 | 0 | 1 | 0 | 0 |   |   |   |
| MAD  | 1 | 0 | 0 | X | X | X |   |   |   |
| MAIP | 0 | 1 | 1 |   |   |   | X | X | X |
| MBIP | 0 | 1 | 1 | X | X | X |   |   |   |
| AMI  | 0 | 1 | 1 |   |   |   | 1 | 0 | 0 |
| AMIP | 0 | 1 | 1 |   |   |   | 1 | 0 | 0 |
| BMI  | 0 | 1 | 1 | 0 | 1 | 0 |   |   |   |
| BMIP | 0 | 1 | 1 | 0 | 1 | 0 |   |   |   |

In both cases the node N0 supplies the address which it is desired to access; only in the writing microinstructions does it send the character (eight bits) to be stored.

The output of the RAM 1 is constituted by a node NC with parallelism of eight bits (NCC0–07) and is used only in the case of reading.

All the microinstructions which provide for reading from or writing in the RAM 1 are executed in three machine cycles: in the first cycle S000 the interpretive state takes place; in the second cycle S004 the address in the RAM 1 at which the microinstruction operates is sent through the node No.

The registers which can be connected to the node N0 as addresses are the registers R0-26, if it is desired to access an address lower than 255 (that is say, the reserved zone of the RAM 1), or a pair of registers (AB or BA), if it is desired to access any address whatsoever of the RAM 1. In FIG. 2, the addressing commands of the memory RAM 1 are represented by the commands CM03–CM07. The command CM03 enables the register R0, while the commands CM04 and CM05 enable the registers RA-31 and RB-32.

From the state S004 the machine passes to the state S002 or the state S003, according to the type of microinstruction being worked out.

The machine passes to the state S002 for all those microinstructions in which it is a B register which supplies the item of data to be written or receives the information read.

It passes to the state S003, on the other hand, when it is an A register which is concerned in the reading or writing.

Within the limits of the states S002 and S003 it is necessary to distinguish two different functions:

1. in carrying out the writing mciroinstructions there is sent, accompanied by the signal T2, the item of data to be written in memory (at the address already specified in the state S004) through the medium of the first eight bits (N000–07) of the node N0. The output NC of the memory is not significant and is not used.

All the blocks of the central unit 3 and also all the commands generated by the MLS 28 for controlling the flow of information between the blocks themselves have been set out in the foregoing description. The MLS 28 has not been described in detail, however; this is preferably nothing but a matrix having as rows the outputs of the registers 26 and 27 and as columns the conductors on which the commands C are generated. The MLS 28 is moreover conditioned by the timer 20 to generate the commands in the desired sequence.

For further details on the MLS 28, reference should be made to the book "Microprogramming, Principles and Practices" by Samir S. Husson, published in 1970 by Prentice-Hall, Inc., Englewood Cliff, N.J., United States of America. In Chapter 2, the principle on which a sequence of commands adapted to execute microinstructions is generated is explained with reference to concrete examples.

11. CHANNEL LOGIC 45

The channel logic 45 is a complex of circuits adapted to handle and coordinate the exchange of data and commands between the central unit 3 and the peripheral units 4 connected thereto, excluding the console 7, which has direct access to the central unit 3 through the node NA-NB.

A detailed description of the channel logic 45 is given in British Patent No. 1,329,753 in the name of the Applicants.

At the present time it is desired only to make it clear that the channel logic 45 handles the microinstructions among the various priority levels present in the processor on the basis of a predetermined order of priority.

The reason for inserting the channel logic 45 is therefore to permit interruption of the microprogram in progress in order to execute an interrupting microprogram having greater priority.

In this particular case there are four priority levels of microprograms, that is:

The main microprogram or microprogram of priority 4, which normally has the function of interpreting and executing the instructions of the program by processing the data and starting the input and output operations:

A microprogram of priority 3, normally intended for executing operations which do not come within the predetermined time sequence of the program, for example prearrangement of interrupts of the program, or microprogrammed handling of input-output operations;

Microprograms of priorities 2 and 1, normally intended for effecting the transfer of data from a peripheral unit to the memory or vice versa.

With each microprogram there is associated an addressing register as shown in FIG. 8.

More particularly, level 4 is addressed by the register L00, level 3 by the register L01, level 2 by the register A13 and level 1 by the register A12.

The transfer of the data from the peripheral units to the central unit 3 may take place in two modes. The first is handled by the gate 99 which permits direct access to the RAM 1 through the node N0 (FIG. 2c). This gate is controlled by the microinstructions for direct access to the RAM 1 which have already been described hereinbefore. The second mode is handled by the gate 70 of the node ND-41 and permits access to the operative registers 31 and 32 through the nodes NA and NB. The data and commands from the peripheral units which are recorded in the operative registers 30 and 31 are processed directly by the set of microinstructions which work on the registers.

DETAILED DESCRIPTION OF THE RAM 1 AND THE ROM 2

A description of the part of RAM 1 used by the DBG programs will now be given with reference to FIG. 9. The first zone, called the reserved zone (ZRM), is at the disposal of the interpreter microprogram and the microprograms handling the peripheral units and of the DBG programs.

The second zone, on the other hand, is intended for recording the programs to be performed, the data on which these programs operate and the results of the processing operations.

Before describing the RAM 1 in detail, it is necessary to mention briefly the operations performed by a special microporgam residing in the ROM 2 and called the interpreter. This microprogram, which will be described in detail hereinafter, performs the following operations:

Interprets the current instruction (Phase ALFA);
Recognizes the program interrupts;
Starts the interrupt program by recognizing whether it is recorded in the RAM 1 or in the ROM 2;
Inhibits all interrupts, including that of the program in the starting stage;
Enables reading from the RAM 1 or from the ROM 2 according to whether the interrupting program resides in the RAM 1 or in the ROM 2;
Carries out the reading of the instruction from the RAM 1 or from the ROM 2;
Recognizes the formats of the instructions;
Extracts the operands; and,
Carries out the instructions by starting the microprograms associated therewith (Phase BETA).

More particularly, the reserved zone ZRM comprises a register PSR-300 (FIG. 9) which contains the parameters of the program in course of processing and is constituted by the following registers (see Table F):

TABLE F

| REG. No. | NAME | Abbrevn. | Number of Bytes | Address From | To | |
|---|---|---|---|---|---|---|
| 310 | BASE REGISTER | RB | 2 | 00B0 | 00B1 | |
| 311 | POINTER 1 | P1 | 2 | 00B2 | 00B3 | |
| 312 | POINTER 2 | P2 | 2 | 00B4 | 00B5 | |
| 313 | PROGRAM CONDITIONS | CP | 1 | 00B6 | — | PSR-300 |
| 314 | INTERRUPT RESERVATION | PI | 1 | 00B7 | — | |
| 315 | INSTRUCTION MODIFN. | MI | 1 | 00B8 | — | |
| 320 | BASE REGISTER | RB | 2 | 00D0 | 00D1 | |
| 321 | POINTER 1 | PI | 2 | 00D2 | 00D3 | |
| 322 | POINTER 2 | P2 | 2 | 00D4 | 00D5 | |
| 323 | PROGRAM CONDITIONS | CP | 1 | 00D6 | — | OPSR-301 |
| 324 | INTERRUPT CODE | CI | 1 | 00D7 | — | |
| 325 | INSTRUCTION MODIFN. | MI | 1 | 00D8 | — | |
| 327 | OPSR ADDRESS | IR | 2 | 00DA | 00DB | |
| 333 | PROGRAM CONDITIONS | CP | 1 | 00BC | — | |
| 334 | ENABLE INTERRUPT | AI | 1 | 00BD | — | IPSR-302 |
| 335 | INTERRUPT ADDRESS | II | 2 | 00BE | 00BF | |
| 350 | STOP ADDRESS | IS | 2 | 00EC | 00ED | — |
| 351 | DBG SERVICE BYTE | BSD | 1 | 00C7 | — | — |
| 352 | WORKING REGISTER | RL | 8 | 00A8 | 00AF | — |
| 353 | REFERENCE TABLE ADDRESS | ITR | 3 | 00D4 | 00D6 | — |

A base register RB-310 which contains the initial address of the memory zone available for normal programs. The register RB-310 is used by the interpreter for computing the addresses of the operands expressed in the instructions. It is modified by suitable instructions during the execution of a program.

Pointer registers P1-311 and P2-312; these are registers used by particular instructions for computing the absolute addresses of the operands. These addresses are obtained by adding P1-311 or P2-312 to RB-310. Their contents can be modified by special instructions.

Program conditions byte CP, as represented in FI'. 9c has the following significance:

The bits 00, 01 are called the condition code (CC) and are complied by the arithmetical and logical instructions for storing the significant results. These conditions are then sensed by other instructions for executing conditional jumps. The bit 02, if a 1 level, indicate that the program being executed is program X; if at 0 level it indicates that program Y is being executed. The bit 03 is used by the interpreter to establish whether the instruction to be executed is to be read from the RAM 1 (bit 03 = 1) or from the ROM 2 (bit 03 = 0). The bit 04, if at 1 level, enables biprogramming, if at 0 level, renders the bit 02 nonsignificant. The bit 05 is normally at one and is used to enable interrupts by the programmer because of DBG requests and is put to zero by the interpreter when the interrupt is activated. The bits 06, 07 are not used.

The Interrupt Reservation Byte (PI-314 of FIG. 9a) is used by the interpreter to actuate a request for an interrupt contained therein.

An interrupt is actuated if the AND between PI and CP has a result different than zero, as will be explained hereinafter (interpreter section). The byte PI is compiled by the microprograms associated with causes of interruptions originating both from the CU 3 and from the peripheral units 4.

The Instruction Modification Byte (MI-315 of FIG. 9a) is used by the interpreter to modify the second byte of the instruction to be executed and can be complied by the programmer as a function of the results of preceding instructions.

The bytes 316, 317 and 318 are used for other purposes which do not concern the invention and they are therefore not described.

The zone ZRM moreover comprises another register OPSR-301 which serves to contain the parameters of the interrupted program. The register OPSR-301 is complied by the interpreter by taking the corresponding registers and bytes from the register PSR-300. When the interrupt program terminates, the last instruction is always for resumption of the interrupted program, that is to say it is an instruction which transfers OPSR-301 to PSR-300. More particularly, the register OPSR-301 comprises:

The registers RB-320, P1-321, P2-322, CP-323, MI-325, 326, which are compiled with the contents of the corresponding registers 310–316 of PSR-300;

The register 324 contains the interrupt code CI (FIG. 9d), that is the code of the cause of interruption in the course of processing in the program being executed. It is compiled by the interpreter before the interrupting program is activated. The causes of interruption specified by the CI are divided into five uniform classes each handled by a different microprogram. To each class there corresponds one bit of the CI; more particularly, classes 1 and 2 each correspond to a single cause of interruption and are identified by the bits 01 and 02, respectively. Classes 3, 4, 5 are identified by the bits 05, 06, 07, respectively, and each comprises a plurality of causes of interruption 16 causes at the most) identified by the bits 00–03.

The reason for recording the code CI of the cause of interruption in OPSR-301 is the fact that the resumption or nonresumption of the interrupted program really depends on the type of interrupt. For example, if the cause of interruption is such that the interrupted program cannot be resumed, then the interrupt program ends by calling the operator. Only after intervention by the operator will it be possible for the interrupted program to be resumed.

The register IR-327 contains the re-entry address of PSR-300 to which corresponds the instruction which is to be executed at the instant of re-entry.

It is compiled by the interpreter by transferring the contents of the operative register L07 (program addresser) at the time of the interrupt.

The zone ZRM moreover comprises a register IPSR-302 which serves to contain the parameters of the interrupt program. The register comprises a byte CP-333 which indicates the program conditions associated therewith. The byte CP has the significance described in FIG. 9a and is transferred to the register CP-313 by the interpreter at the instant of the enabling of the interrupting program.

The register IPSR-302 moreover comprises the interrupt program address II-335 (FIG. 9a), which is loaded into the register L07 of the registers 30 of FIG. 2b by the interpreter if the interrupt program is recorded in the RAM 1.

Figure 9B:
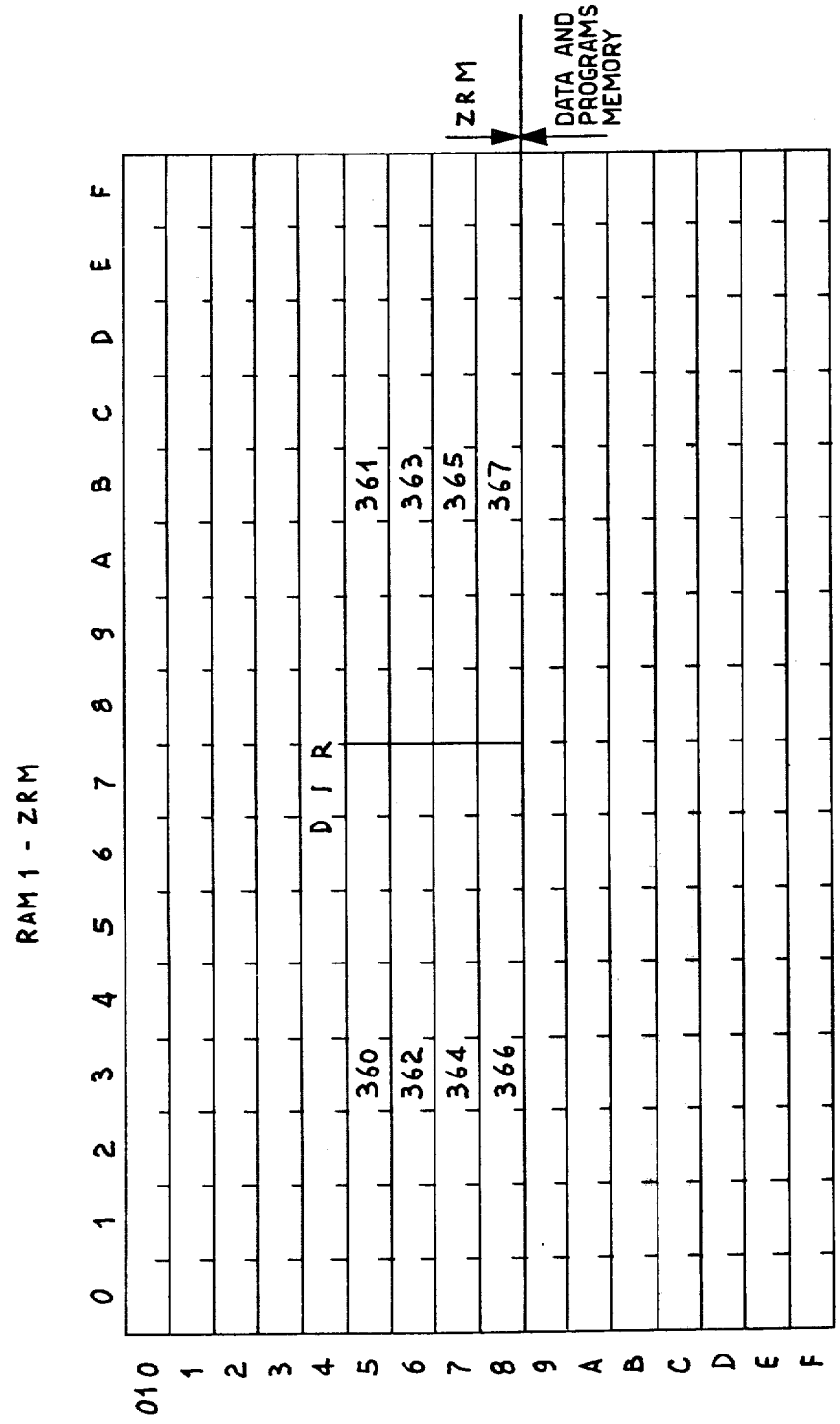
Figure 9C:
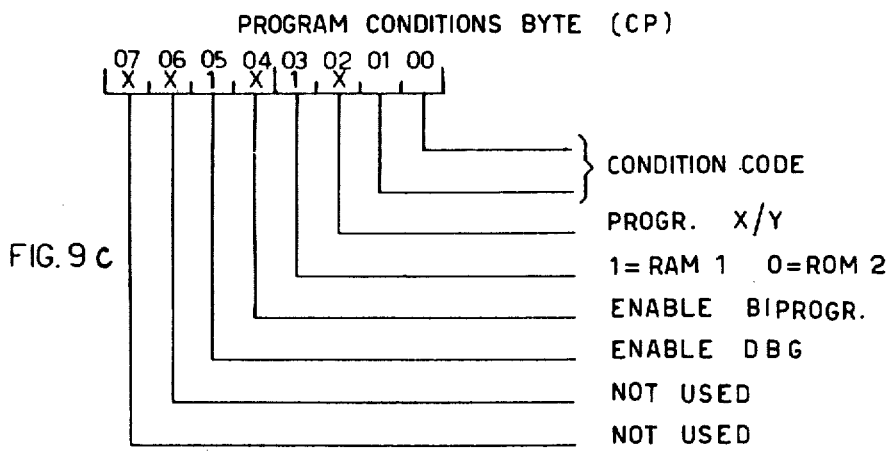
FIGS. 9c to 9e show a number of significant bytes.
Figure 9D:
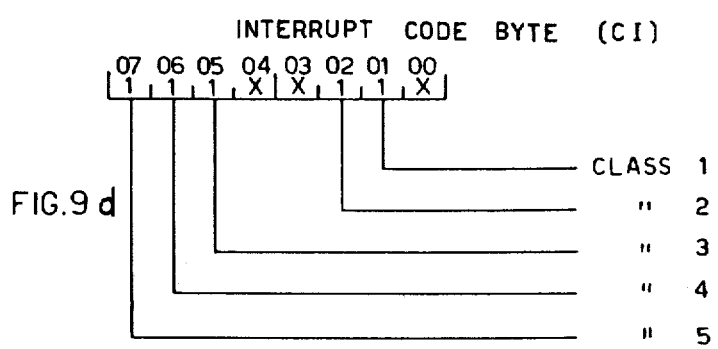
Figure 9E:
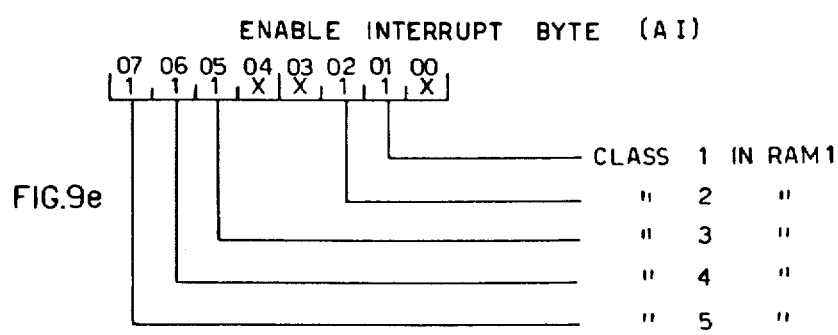

The register 302 moreover comprises the interrupt enable byte AI-334 represented in FIG. 9e, in which the bits 01-02-05-06 and 07, if at 1 level, indicate that the programs corresponding to the respective interrupt classes are recorded in the RAM 1, and, if at zero level, that the programs are recorded in the ROM 2.

More precisely, the interpreter carries out the logical AND function between the interrupt code CI and the interrupt enable byte AI. If the result of the logical AND is zero, this signifies that the program associated with the interrupt is recorded in the ROM 2, if the result is one, the program is recorded in the RAM 1.

In the first case, the interpreter forces the contents of the register II-335 into the operative register L07; in the second case it forces therein the address in the ROM 2 of the beginning of the zone B reserved for the DBG programs. The ZRM moreover comprises a register IS-350 shown in FIG. 9 which contains the STOP address at which the operator desires to halt the processing of the program. The ZRM moreover comprises a DBG service byte (BSD-351).

Referring to FIG. 2c, through the medium of the change-over switch 19 the console 7 activates a switch 60 which is connected directly to the node NA through the wire 61 forming part of the channel 62.

If the change-over switch PLS-19 is in position X, the switch 60 is open and therefore the wire 61 is at zero level. As has been said, this corresponds to selecting program X. On the other hand, when the change-over switch PLS-19 is in position Y, the switch 60 is closed, so that the wire 61 is at one level. The position of PLS-19 corresponding to one of the two logical levels of the switch 60 is periodically sensed or tested together with the other console conditions by a microprogram of level 3. This microprogram transfers to location 0008 (CL400) of the zone ZRM a character having among others a bit which copies the signal present on the wire 61.

This microprogram essentially comprises a microinstruction TCCA (Table A) and a microinstruction AMD.

The timer 20 generates every 60 milliseconds a signal TM which causes an interrupt in the microprogram of level 4 (that is the interpreter microprogram) and executes the microinstruction addressed by the register L01 (addresser of the microprogram of level 3). This microinstruction forms part of a predefined sequence of microinstructions which corresponds to a microprogram GESA which carries out the exchange of the parameters of program X with those of program Y and vice versa, using an area of memory called ASPI, which will be explained hereinafter.

BIPROGRAMMING the initial address of ASPI is complied by the programmer in locations 00C0–00C1 of the ZRM.

TABLE G

| ASPI LOCATIONS | ZRM LOCATIONS | SIGNIFICANCE |
|---|---|---|
| 0–11 | 0090–009B | SERVICE FOR MICROPRG. |
| 12–13 | | ALLOTTED PROGRAM ADDRESS |
| 14–19 | 00A2–00A7 | SERVICE FOR MICROPRG. |
| 20–27 | 00A8–00AF | AUXILIARY REGISTER |
| 28–29 | 00B0–00B1 | BASE REGISTER |
| 30–31 | 00B2–00B3 | POINTER 1 |
| 32–33 | 00B4–00B5 | POINTER 2 |
| 34 | $\phi\phi$B6 | PROGRAM CONDITIONS |
| 35 | $\phi\phi$B7 | INTERRUPT RESERVATION |
| 36 | $\phi\phi$B8 | INSTRUCTION MODIFICATION |
| 37 | $\phi\phi$B9 | CURRENT REFERENCE |
| 38 | $\phi\phi$BA | TYPE OF EDITING |
| 39 | $\phi\phi$BB | FILLING CODE |
| 40–43 | $\phi\phi$BC–00BF | STATE OF INTERRUPT PROG. |
| 44 | 00E3 | SERVICE FOR MICROPRG. |
| 45 | 00E4 | ENABLING OF BARS |
| 46 | 00E5 | ENABLING OF PROGRAM KEYS |
| 47–49 | $\phi\phi$C4–00C6 | REFERENCE TABLE IDENTFN. |
| 50 | $\phi\phi$C7 | SERVICE FOR MICROPRG. |
| 51–58 | 00C8–00CF | CONDITION REGISTER |
| 59–70 | $\phi\phi$D0–00DB | STATE OF INTERRUPTED PROG. |
| 71–86 | 0140–014F | DIR |
| 87–94 | | DECA GUB 1 |
| 95–102 | | DECA GUB 2 |

There will now be described the mechanism of handling the biprogramming, which (as hereinbefore mentioned) permits the execution in parallel of two programs resident in the RAM 1.

For the purpose of clarifying the concept of biprogramming, the following definitions are given first.

Process: is the execution of a program in an area of memory. A process may be of internal type or of external type if involves some peripheral unit.

Program: is the list of instructions which define the process.

From these definitions it follows that the accounting system as used constitutes monoprogramming if it handles a single process.

The work of biprogramming is handled by a microprogram called GEB (biprogramming handler) which permits the excution of the two processes.

If the two programs describe processes of the internal type, the handler GEB allots equal periods of time to each of the two processes. On the other hand, if at least one of the two processes is of the external type, the GEB optimizes the waiting times, allotting them to that process which is able to operate.

From what has been said, the necessity for defining the areas of memory in which each process can operate is therefore apparent. The defining of these areas of memory is effected by the programmer in formulating the biprogramming handler by allotting a first value RBX to the base register RB-310 which defines the beginning of the area of memory allotted to process X. A second value RBY is associated with the beginning of the area of memory associated with process Y.

Figure 10:
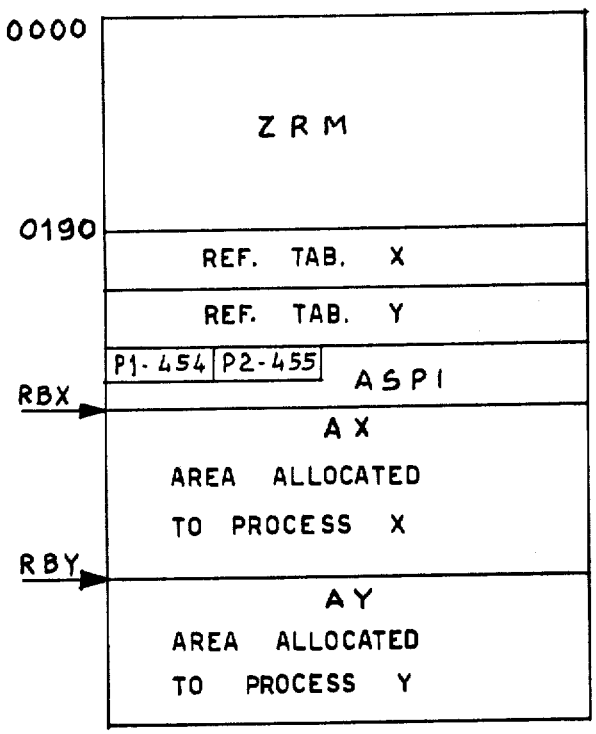
FIG. 10 is a diagram of the RAM2.

It is moreover necessary to define in addition to the zone ZRM of FIG. 9 an extension thereof called zone ASPI, which at any instant contains the parameters of the deactivated process. A memory configuration as shown in FIG. 10 can therefore be obtained. The configuration of the data contained in the zone ASPI is given in the accompanying Table G. The definition of From what has been said, it is clear that at any instant the parameters of the active process will be present in the ZRM and in the operative registers 30, while those of the inactive process are contained in zone ASPI. The accounting system therefore always carries out the processing operations associated with the active process, disregarding the inactive process.

It is to be noted finally that the accounting system is able to recognize at any instant whether process X or process Y is activated by analyzing the bit 02 of the byte CP-313.

One process may surrender control to the other process in two substantially different ways. The first way is obtained before executing an instruction when an interrupt is activated by biprogramming in phase ALFA (FIG. 11).

After the interruption by GEB has been recognized, the microprogram GESA which sees to the exchange of the zone ZRM with zone ASPI is activated. The reservation of an interrupt by GEB is effected by setting the bit 04 of the byte PI-314 to "1." This bit is examined during phase ALFA of each instruction and, if it is found at "1," starts the routine GESA. This bit is activated in two different ways, either by the signal TM generated by the timer 20 every 60 msec if the active process is of internal type, or by the active process itself during the execution of an external instruction which cannot be executed since the deactivated process has already occupied the peripheral concerned.

In this case, the execution of the instruction is interrupted, the program addresser is restored to the first byte of the instruction and the machine goes back to execute phase ALFA of the other process.

Figure 12:
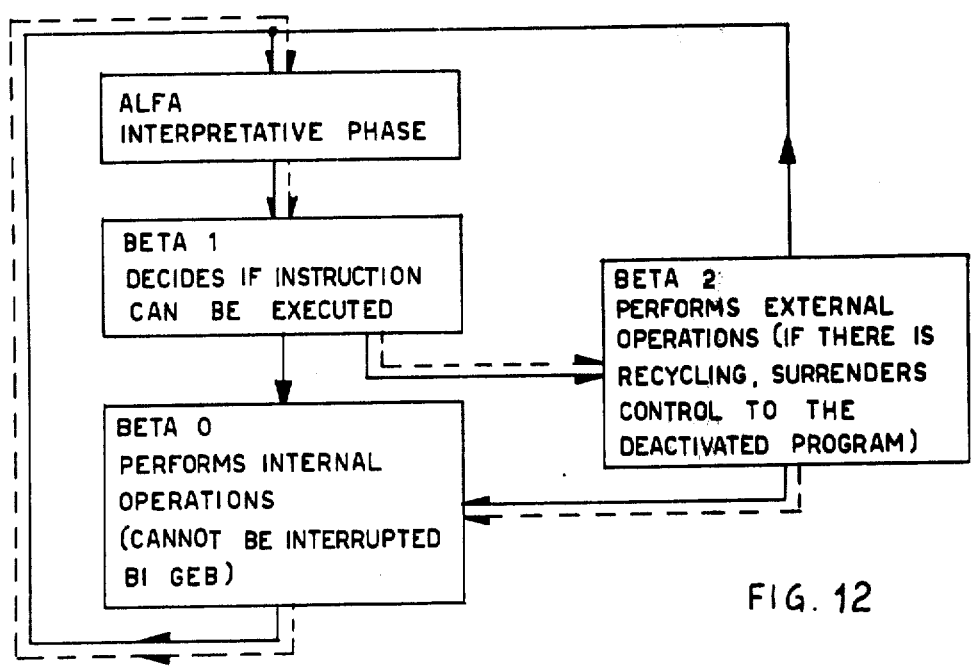
FIG. 12 is a block diagram of the phases of an external instruction.
Figure 11:
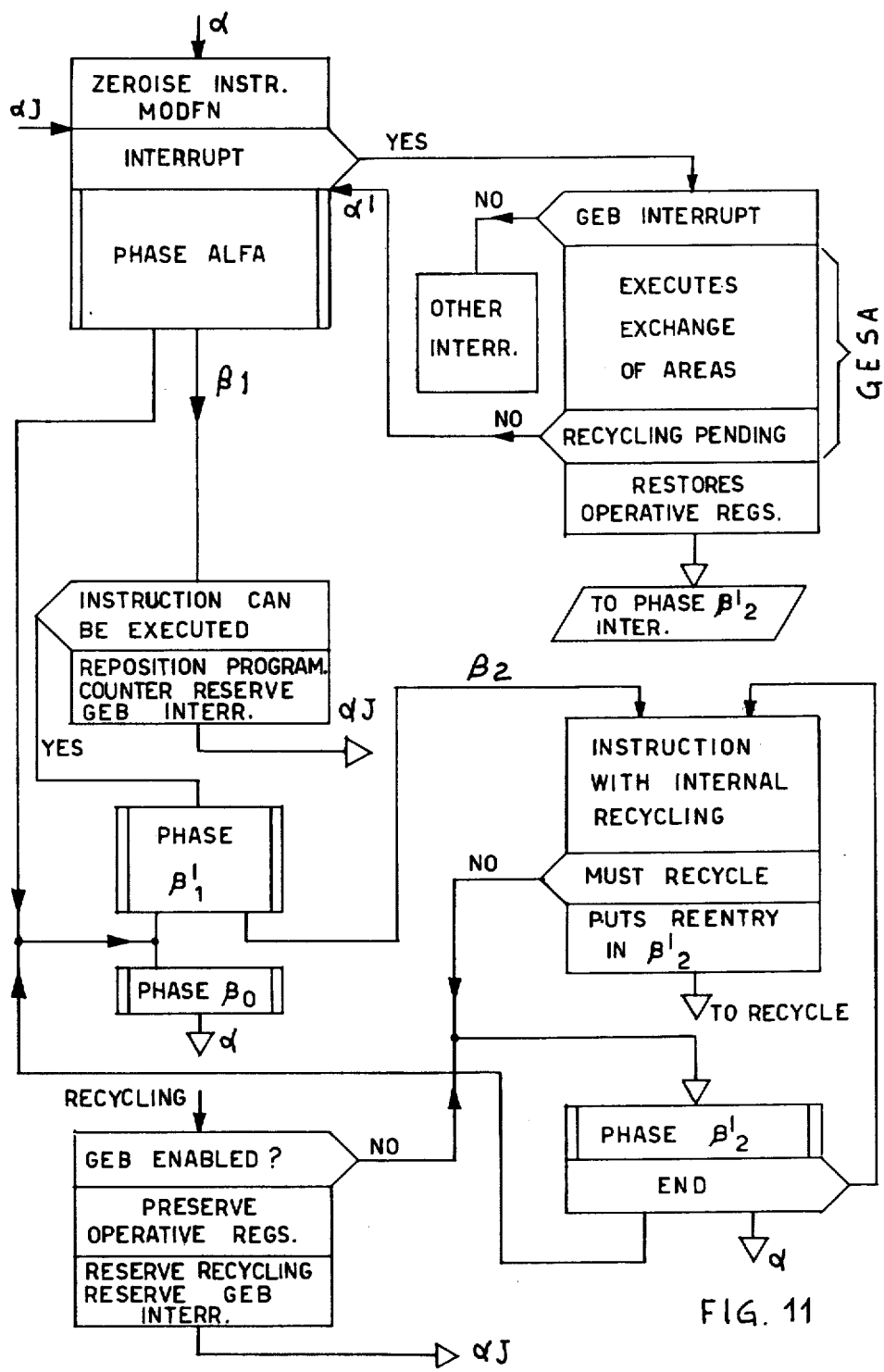
FIG. 11 is a block diagram of the biprogramming.

It can be observed from FIGS. 11 and 12 that the execute phase (BETA) of each instruction can be regarded as divided into three sub-phases which are not necessarily consistent.

Sub-phase BETAO. This is the sub-phase in which the microprogram performs internal operations and can never be interrupted on account of biprogramming. The internal operations are constituted solely by this phase. This sub-phase can be executed solely by phase ALFA.

Sub-phase BETA1. In this sub-phase, the microprogram decides whether or not it is possible to execute the instruction. It may be followed by a sub-phase BETA0 or by a sub-phase BETA2.

Sub-phase BETA2. In addition to executing operations relating to the current instruction, the microprogram surrenders control to the other program if there are waiting times. This sub-phase may be followed only by the phAse ALFA or by a sub-phase BETA0.

The flow diagram of FIG. 11 describes the opertions effected by the microprogram GEB using the set of microinstructions given in Table A.

Figure 13:
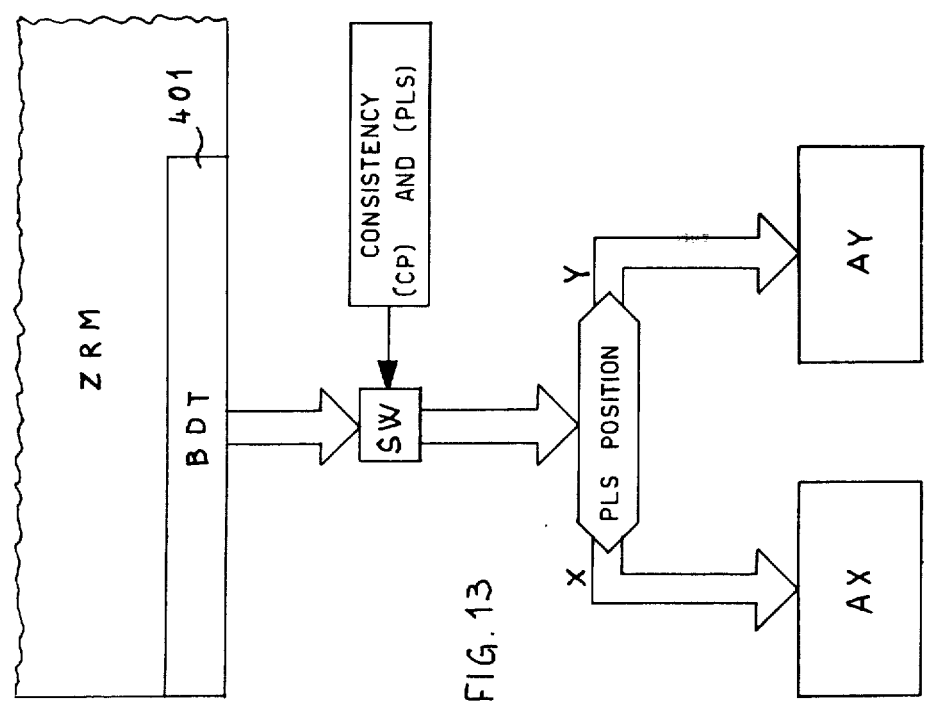
FIG. 13 is a block diagram of the emptying of the keyboard buffer.

Allocation of the Keyboard (FIGS. 11, 12 and 13)

As has been stated hereinbefore, the keyboard is allocated to the process selected by the change-over switch PLS 19. The handling of the keyboard is entrusted to special introduction instructions, of which only that part which relates to the invention will be described in detail. More particularly, these introduction instructions are executed by means of the sequence of sub-phases BETA1, BETA2, and BETA0. In phase BETA1, it is decided whether the introduction instruction itself can be executed or not on the basis of the state of the keyboard.

The state of the keyboard is identified by one of the following conditions:
—Keyboard enabled
—Keyboard deactivated
—BDT-401 full
—Introduction started on the deactivated process
—Position of PLS 19.

The first three conditions operate irrespective of which of the two processes is activated. The last two, on the other hand, assume opposite logical significances in dependence upon the process which calls them.

The way in which the first three conditions are tested is not described because this does not comprise an object of the invention.

In phase BETA2, BDT-401 is unloaded into the memory zone AX or AY (FIG. 13) in dependence upon the position of PLS-19.

Phase BETA0 performs internal operations on the data introduced in phase BETA2.

As to phase BETA1 (FIGS. 9 and 14, Table H), this phase examines whether the position of the change-over switch PLS-19 (which is stored in the bit 03 of the byte CL-400 recorded at the address 0008 of the ZRM) is consistent with the active process (which is identified by the bit 02 of the byte CP-313 recorded at the address φφB6 of PSR-300).

Moreover, this phase examines whether an introduction instruction has been previously initiated by the inactive process. This information is stored by this instruction in location 06 of the service byte BS-410 recorded at the address 00DE. Consistency between the position of the change-over switch PLS-19 and the active process is verified as shown symbolically by the logical decision 420 for process X and the logical decision 421 for process Y. It is apparent from Table H that the verification of consistency is effected by loading the byte CP-313 into the switching elements DI-40 and examining the state of the flip-flop D02 and thereafter transferring the byte CL-400 to the switching elements DI-40 and examining the state of the flip-flop D03. There is consistency if the logical level of the two flip-flops examined is the same and in this case the instruction can be executed inasmuch as it is apparent that the keyboard is allocated to the process active at that instant. In the case of inconsistency, introduction from the keyboard cannot be carried out, because at that instant the process selected by the change-over switch PLS-19 is not active. In the case of there being consistency, it is moreover verified whether the keyboard has already been previously allocated to the process inactive at that instant. Both in this case and in the preceding case of inconsistency, the instruction is not executed and the acoustic signalling device 100 for calling the operator is activated and the lamp PLA-18 is lit up.

This is done by means of a jump to the address IGOTA3, where the bit 00 of the byte BL-422 which corresponds to the lamp PLA-18 is set to the 1 level.

It is to be noted that the bits of the byte BL-422 correspond one by one to the seven console lamps and to the buzzer 100 and, therefore, if they are at one level, the corresponding lamps light up.

Verification concerning engagement of the keyboard by part of the inactive process is effected by transferring the byte BS-410 to the switching elements DI-40 and examining the state of the flip-flop D07 (see Table H). If this flip-flop is at 0 level (keyboard free), the machine goes on to interpret the instruction code; otherwise a jump is made to the address IGOTA3, where the routine for lighting the lamp PLA-18 and switching on the buzzer 100 begins.

At this point a call is reserved by the biprogramming handler (GEB) for effecting exchange of the active program (since the current instruction thereof cannot be executed) with the deactivated program. Before this happens, the program counter CP-313 for the active program is decremented by two units so as to prearrange correct resumption thereof. Return is then effected to phase ALFA, starting from which the exchange is carried out between the parameters of the active program and those recorded in ASPI (FIG. 10).

On the other hand, if consistency is found between CP and PLS and, moreover, the keyboard is free, the instruction for input from the keyboard can be executed.

TABLE H

| | | (FIG. 14) | | |
|---|---|---|---|---|
| SYMBOLIC NAME | FUNCTION CODE | OPERANDS | | HEXADECIMAL INSTRUCTION |
| IGOTA 1 | MAD | A02 | CDE | 0 2 D E |
| | MAD | A11 | CB6 | 0 B B 6 |
| | MAD | A10 | CD8 | 0 A O 8 |
| | TADI | A11 | | 3 B E 7 |
| | SADI | D02 | IGOTAR | 3 2 F 6 |
| | SDIA | A10 | | 3 A 8 7 |
| | SADI | D03 | IGOTA3 | 3 3 F 7 |
| | SDIA | A02 | | 3 2 8 7 |
| | SADI | D06 | IGOTA3 | 3 6 2 2 |

Figure 14:
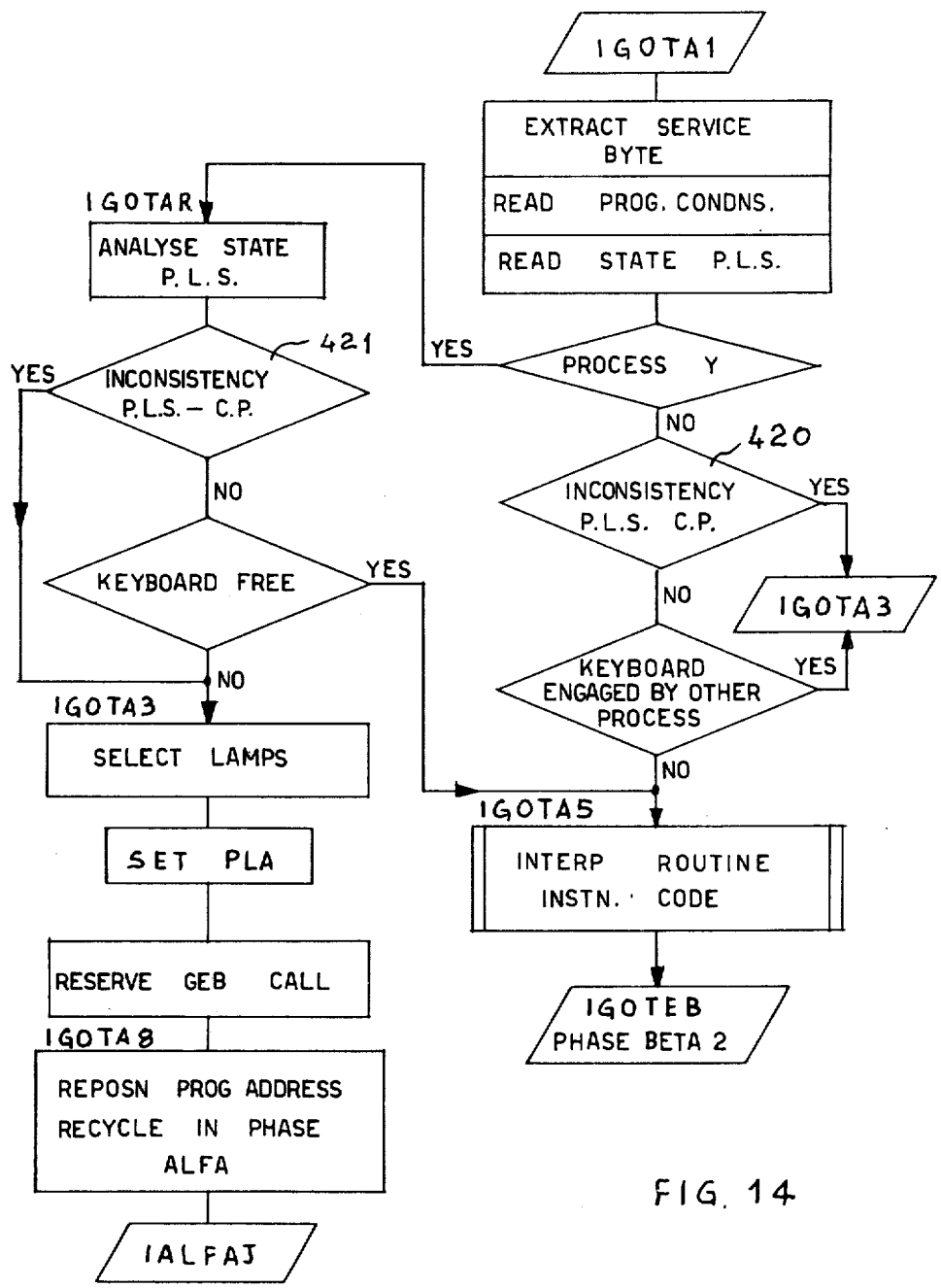
FIG. 14 is a block diagram of the sub-phase BETA 1 of an introduction instruction.
Figure 15:
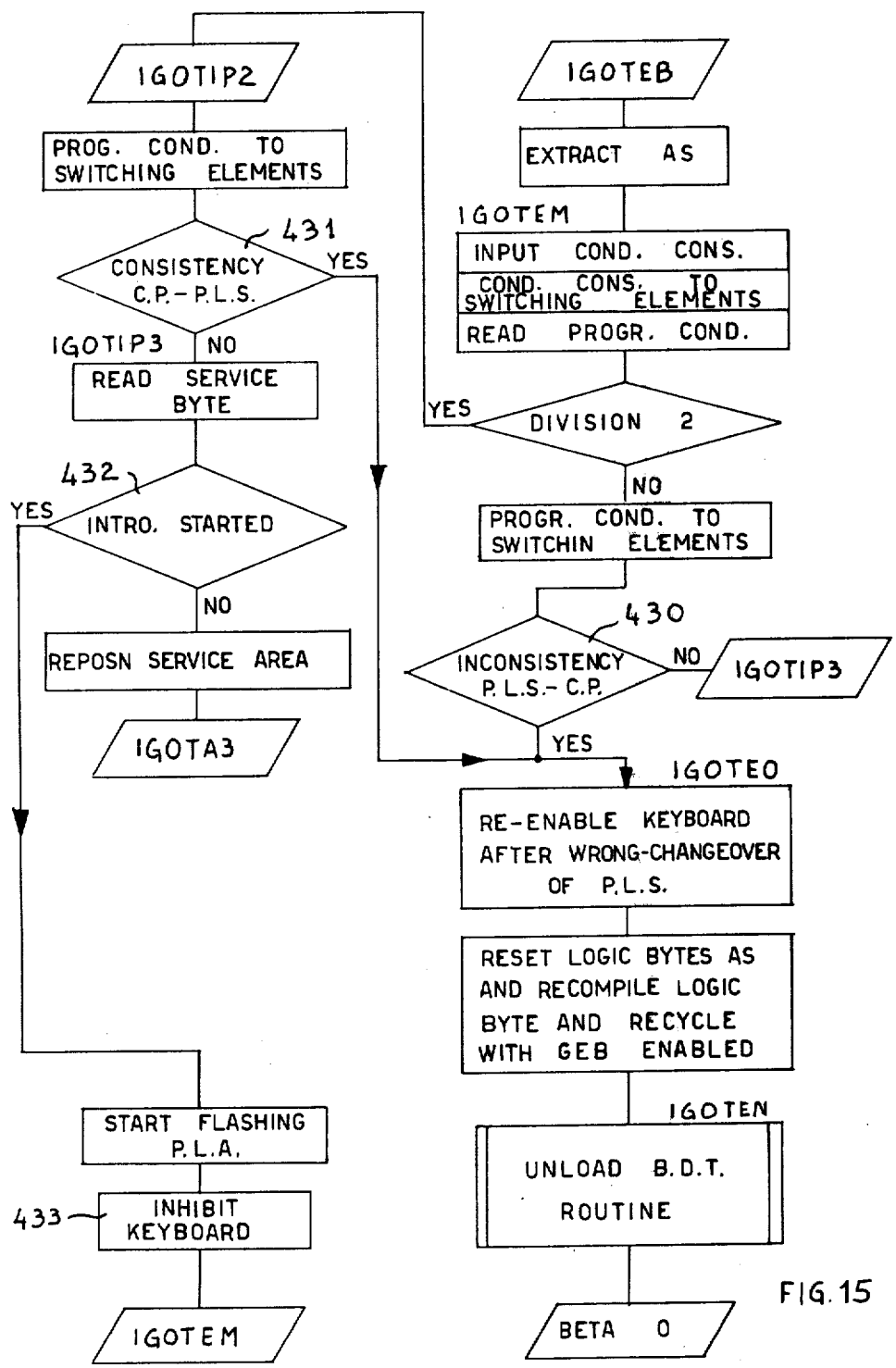
FIG. 15 is a block diagram of the sub-phase BETA2 of the introduction instruction.

TABLE H-continued (FIG. 14)

| SYMBOLIC NAME | FUNCTION CODE | OPERANDS | | HEXADECIMAL INSTRUCTION |
|---|---|---|---|---|
| IGOTA5 | AMD | A14 | CDE | 0 E D E |
| IGOTAR | SDIA | A10 | | 3 A 8 7 |
| | SADO | D03 | IGOTA3 | 2 3 2 2 |
| | SDIA | A02 | | 3 2 8 7 |
| | SADO | D06 | IGOTA5 | 2 6 0 2 |
| IGOTA3 | CRTB | B12 | C81 | 9 C 8 1 |
| | CRTB | B02 | C09 | 9 2 0 9 |
| | COM1 | | | 3 1 7 3 |
| IGOTA4 | CRTB | B12 | C10 | 9 0 1 0 |
| | CRTB | B02 | C0A | 9 2 0 A |
| | COM1 | | | 3 1 7 3 |
| IGOTA8 | DCL | L07 | | A 7 5 E |
| | DCL | L07 | | A 7 5 E |
| | SAI | IALFAJ | | 0 2 0 2 |

Consequently, the machine goes on to the routine of interpretation of the code of the instruction for differentiating the various types of introduction; this routine is not described as it is not part of this invention. It terminates with a jump to the address IGOTEB, where phase BETA2 begins.

Phase BETA2 (FIGS. 9–15 and Table J) serves to transfer the contents of the keyboard buffer BDT-401 (FIG. 13) to the memory zone AX or AY in dependence upon the position of the change-over switch PLS-19. Emptying of the buffer BDT-401 is enabled only when there is consistency between the position of PLS and the active process.

In fact, the condition of inconsistency may also occur in phase BETA2 if the operator erroneously changes over the change-over switch PLS-19 before concluding the introduction already started. After detecting an inconsistency (logical decisions 430 and 431), a check is made by reading the bit 06 of the byte BS-410 whether an introduction relating to the inactive process has already been started. If this is verified, it means that the operator has changed the change-over switch PLS-19 during an introduction (misoperation).

For example, let it be assumed that the operator has started an introduction for process X, he has positioned the change-over switch PLS-19 in position X and the introduction instruction puts the bit 06 of the byte BS-410 at 1 1 level.

While the operator is introducing the data, the sound of the buzzer 100 and the lighting of the lamp PLA-18 warn him, as has been seen, that process Y requires his intervention.

At this point, he erroneously changes the change-over switch PLS over to position Y, therefore changing the contents of the bit 03 of the byte CL400, which now indicates that the process selected is process Y.

TABLE J (FIG. 15)

| SYMBOLIC NAME | FUNCTION CODE | OPERANDS | | HEXADECIMAL INSTRUCTION |
|---|---|---|---|---|
| IGOTP2 | TADI | A02 | | 3 2 E 7 |
| | SADI | D02 | IGOTEO | 3 2 1 F |
| IGOTP3 | MAD | A02 | CDE | 3 2 D E |
| | TADI | A02 | | 3 2 E 7 |
| | SADI | D06 | IGOTAT | 3 6 E F |
| | CRTB | B12 | CD0 | 9 C D 0 |
| | CRTB | B02 | CDC | 9 2 D C |
| | COM1 | | | 3 1 7 3 |
| | SAI | IGOTA3 | | 0 8 2 2 |
| IGOTSB | TBA | A10 | B14 | 5 A E 3 |
| | SAI | IGOTEM | | 0 9 1 9 |
| IGOTEB | MAD | A11 | CE0 | C B E 0 |
| IGOTEM | TCCA | A02 | | A 2 8 8 |
| | TADI | A02 | | 3 2 E 7 |
| | MAD | A02 | CB6 | 0 2 B 6 |
| | SADI | D03 | IGOTP2 | 3 3 0 D |
| | TADI | A02 | | 3 2 E 7 |
| | SADI | D02 | IGOTP3 | 3 2 0 F |
| IGOTEO | CRTB | B12 | C80 | 9 C 8 0 |
| | CRTB | B02 | C07 | 9 2 0 7 |
| | CRTB | B09 | C2F | 9 9 2 F |
| | ANDA | A11 | B09 | 6 B 9 8 |
| | ORB | A11 | B12 | 6 B C D |
| | COM1 | | | 3 1 7 3 |
| IGOTEN | CRTB | B09 | IGOTEO | 9 9 2 9 |
| | CRTA | A02 | C00 | 3 2 0 0 |
| IGOER4 | CRTB | B02 | C00 | 9 2 0 0 |
| | COM1 | | | 3 1 7 3 |
| IGOTEO | CRTB | B12 | C40 | 9 0 4 0 |
| IGOTAT | CRTA | A02 | C15 | 3 2 1 5 |
| | AMD | A02 | CDF | 0 2 D F |
| | CRTB | B12 | C7F | 9 C 7 F |
| | CRTB | B02 | C0C | 9 2 0 C |
| | COM1 | | | 3 1 7 3 |
| | SAI | | IGOTEM | 0 9 9 F |

At this point, phase BETA2 of the introduction has already been started since consistency has been found in phase BETA1 between position X of PLS-19 and the active process (X). If, therefore, a situation of inconsistency is encountered in phase BETA2, this is due to an improper change-over of PLS-19, which now selects process Y (which is deactivated at this instant). Therefore, if an introduction for process X has already been started (logical decision 432), the keyboard is inhibited and the flashing of the lamp PLA-18 is started and indicates in this way a situation of abnormality (block 433).

The method by which the flashing of lamp PLA-18 is controlled is by writing (see address IGOTAT) the number 00010101 in the byte BP-412 recorded at the address OODF of the ZRM. This configuration, suitably timed and serialized, causes the flashing of the lamp PLA. Phase BETA2 then jumps to the address IGOTEM, thereby passing through the cycle IGOTEM - logical decisions 430 and 431 - IGOTIP3 - logical decision 432 - block 433 - IGOTEM, until the situation of consistency is present again. This occurs when the operator repositions the change-over switch PLS-19 in position X.

If the operator has changed PLS-19 over without having begun the introduction (logical decision 432) for process X, exchange of the ZRM with ASPI is effected and return to the address IGOTA3 (FIG. 14) takes place, whereby control is surrendered to process Y.

To sum up, if the situation of consistency is present in phase BETA2, the contents of BDT-401 are transferred to the zone AX or AY of the memory in dependence upon the process selected by PLS-19. It is to be noted that the emptying of BDT-401 takes place only when the process selected by PLS-19 is active, so that the data contained therein is transferred to the zone AX or AY allocated to the active process.

It is clear from what has been said how, by means of the system just described, it is possible:

a. to allocate the keyboard to one of two processes, so that the data entered is automatically transferred to the memory zone allocated to the process selected;

b. to warn the operator by means of the sound of a buzzer and the lighting of a lamp that the process not selected requires his intervention;

c. to prevent it being possible to actuate the selector switch PLS-19 before concluding the introduction by warning the operator of the situation of abnormality by the flashing of the lamp PLA-18.

Figure 16:
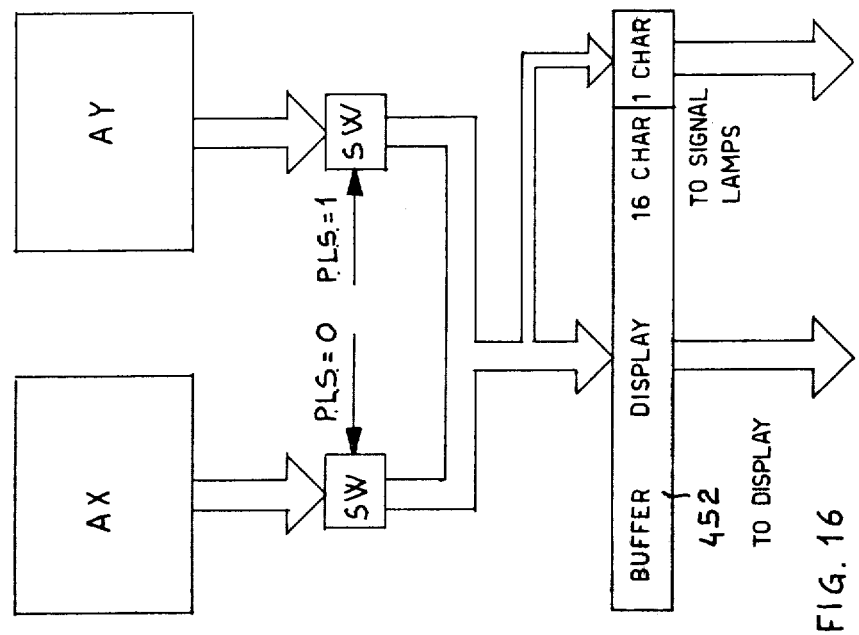
FIG. 16 is a block diagram of the zone to be visually displayed.

Allocation of the Display (FIG. 16)

As has been mentioned hereinbefore, the display 6, the signalling lamps 12-18 and the acoustic signalling device 100 are also allocated to the program selected by the change-over switch PLS-19.

The mechanism of allocation of the display is represented by the symbolic diagram of FIG. 16. It can be observed from this how the sole condition for the loading of the display buffer is constituted by the position of the change-over switch PLS-19 stored in the bit 03 of the byte CL400. This bit 03 is examined by putting the byte CL400 into the switching elements and testing the state of the flip-flop DI03. If this flip-flop is at zero logical level, the message relating to process X taken from the memory zone AX allocated thereto is visually displayed, otherwise the message relating to process Y is displayed. It is to be noted that the message to be visually displayed comprises in each case a further byte which contains the logical signals associated with the program which activates the signalling lamps 12-18 and the buzzer 100 which are actuated simultaneously with the display 6.

The mechanism by which the messages are visually displayed will now be described.

In the zone ZRM there is allocated a register 452 which is used as a buffer for the display 6 and for the lamps.

The instruction which visually displays the messages has the following format:

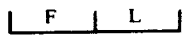

in which F is the function code and L is the length of the field to be visualized. The operation performed by this instruction is that of visually displaying the memory field addressed by the pointer P1-311 or P2-312 (as specified by F) for the length L. During the execute phase, this instruction provides for the compilation in one of two registers 450 and 451 (FIG. 9) of the absolute address of the field to be visually displayed in dependence upon the position of PLS-19. More particularly, this instruction examines the bit 03 of the byte CL-400 and, if this is at zero level, transfers to the second and third bytes of the register 450 the absolute address of the field to be visually displayed computed by adding the contents of the pointer defined by F to the contents of the base register. Moreover, it transfers the field L to the first byte of the register 450. If, on the other hand, the bit 03 is at 1 level, the the address is compiled in register 451 under the same conditions.

Thereafter, the microprogram associated with the instruction to be visually displayed transfers the buffer 452 of the field addressed by the register 450 or 451 in dependence upon the position of the change-over switch PLS-19. The seventeenth location of the buffer 452, on the other hand, is filled by simply transferring the contents of the byte BL-422 which has been previously compiled by the microprograms which control the lamps.

It is clear from what has been said how the actuation of the change-over switch PLS-19 also enables the display 6 and the console 7 to be allocated to one of the two processes.

It is understood that modifications or replacement of parts may be made in the accounting system according to the invention without departing from the scope of the invention.

For example, the display 6 which, in the embodiment described, comprises 16 digits each of which is produced by means of photoemissive diodes, may be replaced by a cathode ray display.

This becomes particularly useful if the accounting system is used as a bank counter terminal. These kinds of terminals handle not only accounting operations, but also counter operations, for which reason they are connected to a remote computer which contains a file, for example of customers.

For this reason, it becomes necessary to display visually a large number of characters and consequently in such cases a CRT display unit is used.

Of course, in this case, only modifications and the handling circuits of the display will be necessary, while everything that has been described as regards the allocation of the display to one of the two programs remains substantially unchanged.

What we claim is:

1. Biprogrammable electronic accounting system comprising
    a single keyboard for introducing information into the system,
    a single visual display for visually displaying messages for an operator,
    a memory comprising a first and second zone each recording data and instructions relating to a first and a second program respectively,
    a processing unit for executing in parallel the instructions of said first and second programs,
    control means for conditioning the processing unit to alternately execute either the instructions associated with the first program or the second program, said programs being thereby alternately rendered active or inactive,
    a single service console for signalling to said operator a condition requiring said operator's attention in either of said first and second programs running in parallel,
    a change-over switch for establishing a signal level having a first value associated with the first program and a second value associated with the second program,
    means for storing an indication of the active or inactive status of said first and second programs, and
    means for checking said stored indication against the signal values established by the change-over switch for allocating at least one of the keyboard and the visual display and the console selectively to the first or the second program 2. An accounting system according to claim 1, wherein the memory comprises
    a plurality of registers controlled by said control means for storing the state of the program being executed by the processing unit, comprising
    a first register for storing information comprising said first and second signal level values relating to the position of the change-over switch,
    a second register comprising said indication storing means defining the active or inactive status of the first and second programs and
    a third register for storing a signal from said first or said second program requesting allocation of the keyboard selectively to the first or the second program, the system further including
    comparison means for comparing the information stored in the first register with that stored in the second register for determining that the program associated with the position of the change-over switch is consistent with the active program,
    means for analyzing the information in the third register for recognizing whether the keyboard is allocated to the program actively being executed by the processing unit, said analyzing means being enabled by said comparison means, and
    means enabled by the analyzing means for introducing the information coming from the keyboard into the first zone or the second zone of said memory in dependence upon the program being executed.

3. An accounting system according to claim 2, comprising means responsive to the analyzing means and the comparison means for signalling that the keyboard is allocated to the inactive program, said introducing means being disabled by said analyzing means when said signalling means is activated.

4. An accounting system according to claim 3, wherein said service console comprises
    a plurality of lamps and an acoustic signalling device, and said signalling means comprises
    a fourth register of said plurality of registers in said memory storing information bits selectively associated with the lamps and the signalling device, and
    means for setting said stored information in the fourth register for activating one of the lamps and the signalling device.

5. A biprogrammable electronic accounting system comprising
    a single keyboard for introducing information into the system,
    a single visual display for visually displaying messages for an operator,
    a memory comprising a first and second zone each recording data and instructions relating to a first and a second program, respectively,
    a processing unit for executing in parallel the instructions of said first and second programs,
    control means for conditioning the processing unit to alternately execute either the instructions associated with the first program or the second program, said programs being thereby alternately rendered active or inactive,
    a single service console for signalling to said operator a condition requiring said operator's attention in either of said first and second programs running in parallel,
    a change-over switch for establishing a signal level having a first value associated with the first program and a second value associated with the second program,
    a first register for storing information comprising said first and second signal level values relating to the position of the change-over switch,
    a second register connected to the visual display and to the console for storing the information to be visually displayed and for control of the console, a third register for recording the address in the memory of the information to be visually displayed relating to the first program,
    a fourth register for recording the address in the memory of the information to be visually displayed relating to the second program, and visual display means controlled by the signal value recorded in the first register for selectively transferring to the second register the information contained in the third and fourth registers, whereby the visual display and the console are allocated to the program selected by the change-over switch.

* * * * *